(12) United States Patent
Goyal et al.

(10) Patent No.: US 12,127,155 B2
(45) Date of Patent: Oct. 22, 2024

(54) WTRU ASSISTED POSITIONING

(71) Applicant: InterDigital Patent Holdings, Inc., Wilmington, DE (US)

(72) Inventors: Sanjay Goyal, Deer Park, NY (US); Kevin T. Wanuga, Souderton, PA (US); Arnab Roy, Phoenixville, PA (US); Alpaslan Demir, East Meadow, NY (US); Janet Stern-Berkowitz, Little Neck, NY (US); Mihaela Beluri, Jericho, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 318 days.

(21) Appl. No.: 17/635,478

(22) PCT Filed: Aug. 13, 2020

(86) PCT No.: PCT/US2020/046177
§ 371 (c)(1),
(2) Date: Feb. 15, 2022

(87) PCT Pub. No.: WO2021/030583
PCT Pub. Date: Feb. 18, 2021

(65) Prior Publication Data
US 2022/0295442 A1  Sep. 15, 2022

Related U.S. Application Data

(60) Provisional application No. 62/887,215, filed on Aug. 15, 2019.

(51) Int. Cl.
*H04W 24/10* (2009.01)
*G01S 5/10* (2006.01)
*H04W 64/00* (2009.01)

(52) U.S. Cl.
CPC ............... *H04W 64/00* (2013.01); *G01S 5/10* (2013.01); *H04W 24/10* (2013.01)

(58) Field of Classification Search
CPC ............................ H04W 64/00; H04W 24/10
See application file for complete search history.

(56) References Cited

U.S. PATENT DOCUMENTS 9,964,626 B2  5/2018  Kim et al.
10,314,000 B2  6/2019  Huang et al.
(Continued)

FOREIGN PATENT DOCUMENTS

EP  2979494 A1  2/2016
EP  3198894 A1  8/2017
(Continued)

OTHER PUBLICATIONS

3rd Generation Partnership Project (3GPP), TR 38.855 V1.0.0, "Technical Specification Group Radio Access Network, Study on NR Positioning Support (Release 16)", Dec. 2018, pp. 1-15.
(Continued)

*Primary Examiner* — Michael T Vu
(74) *Attorney, Agent, or Firm* — Condo Roccia Kopitw LLP

(57) ABSTRACT

A WTRU may track parameters associated with the WTRU or target WTRUs. The parameters may be associated with positioning and/or sidelink communications. The WTRU may receive a configuration for transmission of reference signals to target WTRUs. The WTRU may transmit one or more reference signals on one or more configured sidelink resources. The WTRU may receive respective measurement report(s) from respective target WTRU(s) (e.g., a target WTRU may receive a reference signal transmitted by the WTRU and send an associated measurement report). The WTRU may be configured to send the received target
(Continued)

WTRU measurement(s) to the network entity. The WTRU may send each of the received measurements. The WTRU may send the received measurement(s) if condition(s) are satisfied. For example, if a first measurement associated with a first measurement report from a first target WTRU exceeds a first threshold, the WTRU may send the first measurement to the network entity.

18 Claims, 16 Drawing Sheets

(56) References Cited

U.S. PATENT DOCUMENTS

| | | | |
|---|---|---|---|
| 10,638,263 | B2 | 4/2020 | Tian et al. |
| 2014/0057667 | A1 | 2/2014 | Blankenship et al. |
| 2016/0014657 | A1* | 1/2016 | Le ............... H04B 7/18506 455/436 |
| 2016/0100355 | A1 | 4/2016 | Chen et al. |
| 2017/0034800 | A1 | 2/2017 | Abedini et al. |
| 2017/0212206 | A1 | 7/2017 | Kim et al. |
| 2017/0280423 | A1* | 9/2017 | Zhao ............... H04W 8/005 |

FOREIGN PATENT DOCUMENTS

| | | |
|---|---|---|
| EP | 3198897 A1 | 8/2017 |
| WO | 2016/095210 A1 | 6/2016 |
| WO | 2020/091970 A1 | 5/2020 |

OTHER PUBLICATIONS

3rd Generation Partnership Project (3GPP), TS 22.261 V16.6.0, "Technical Specification Group Services and System Aspects, Service Requirements for the 5G System, Stage 1 (Release 16)", Dec. 2018, pp. 1-73.

3rd Generation Partnership Project (3GPP), TS 36.305 V15.2.0, "Technical Specification Group Radio Access Network, Evolved Universal Terrestrial Radio Access Network (E-UTRAN), Stage 2 Functional Specification of User Equipment (UE) Positioning in E-UTRAN (Release 15)", Dec. 2018, pp. 1-88.

"FCC Fourth Report and Order: Wireless E911 Location Accuracy Requirements", Available at <https://www.fcc.gov/document/fcc-adopts-new-wireless-indoor-e911-location-accuracy-requirements>, Feb. 3, 2015, 2 pages.

* cited by examiner

WTRU ASSISTED POSITIONING

CROSS-REFERENCE TO RELATED APPLICATIONS

This application is the National Stage Entry under 35 U.S.C. § 371 of Patent Cooperation Treaty Application No. PCT/US2020/046177, filed Aug. 13, 2020, which claims the benefit of Provisional U.S. Patent Application No. 62/887, 215, filed Aug. 15, 2019, the disclosure of which is incorporated herein by reference in its entirety.

BACKGROUND

A purpose of positioning may be to determine the geographical location of a WTRU. The position may be used to support internal E-UTRAN functions, such as Radio Resource Management, or location-based services and applications for operators, subscribers, or third-party service providers. Examples of these services and applications may include emergency call support (e.g., such as to support IMS emergency call over EPS or to meet the E-911 regulatory requirement), Google Maps, targeted advertising, etc.

SUMMARY

Systems, methods, and instrumentalities are disclosed herein associated with positioning and/or sidelink communications. A wireless transmit/receive unit (WTRU), such as an anchor WTRU, may track one or more parameters associated with the WTRU or other WTRUs (e.g., target WTRUs). The one or more parameters may be associated with positioning and/or sidelink communications. The WTRU may receive a configuration associated with transmission of reference signals (e.g., sidelink synchronization signals) to target WTRUs. The WTRU may receive the configuration from a network entity such as a gNB, eNB, base station, positioning server etc. The configuration may indicate and/or include one or more of the following: a respective target WTRU identifier for a respective target WTRU, sidelink resources, one or more threshold values, a transmit power, or spatial information (e.g., transmit beam information, for example number of beams, beam IDs, etc.). The WTRU may transmit one or more reference signals on one or more of the sidelink resources. The WTRU may monitor for and/or receive respective measurement report(s) from respective target WTRU(s) (e.g., a target WTRU may receive a reference signal transmitted by the WTRU and send an associated measurement report to the WTRU with a measurement associated with the reference signal). The WTRU may be configured to send the received target WTRU measurement(s) to the network entity. The WTRU may send each of the received measurements, for example the WTRU may send a group report that includes measurements from multiple target WTRUs (e.g., whose measurements exceed a threshold, for example as disclosed herein). The WTRU may send the received measurement(s) if condition(s) are satisfied. If a first measurement associated with a first measurement report from a first target WTRU exceeds a first threshold, the WTRU may send the first measurement to the network entity. If the first measurement associated with the first measurement report from the first target WTRU does not exceed the first threshold, the WTRU may not send the first measurement to the network entity. The WTRU may determine that the first measurement exceeds the first threshold if the first measurement exceeds a previous value associated with the first target WTRU by an amount.

A WTRU may indicate (e.g., to a network entity) that it is not capable of or no longer capable of serving as an anchor WTRU. The WTRU may determine that its location has changed significantly causing it to be unable to monitor target WTRU(s) and/or the WTRU may not be able to listen to a threshold number of network device(s) (e.g., such as gNB(s), eNB(s), base station(s), etc.). Based on the determination, the WTRU may send the indication to a network entity that indicates the determined condition is satisfied. The WTRU may stop its function as an anchor WTRU based on sending the indication. The WTRU may stop its function as an anchor WTRU based on receiving an indication from the network entity (e.g., in response to the indication sent by the WTRU).

A WTRU may be configured to determine whether to send an indication (e.g., to a network entity) that indicates a change in a rate and/or a periodicity of measurements and/or reporting by associated target WTRU(s) and/or monitoring and/or reporting by the WTRU. The indication (e.g., a request to the network entity) may indicate that a change in the rate and/or the periodicity of measurements and/or reporting by target WTRU(s) is needed and/or that a change in the rate and/or the periodicity of monitoring and/or reporting by the WTRU is needed (e.g., where the changed parameter(s) may be referred to as measurements, reporting, and/or monitoring). The network entity may send the WTRU an indication to change the rate and/or the periodicity of the measurements, reporting, and/or monitoring (e.g., in response to receiving the indication from the WTRU). The WTRU may send such an indication as a notification that it is changing the rate and/or the periodicity of the measurements, reporting, and/or monitoring. The WTRU may change the measurements and/or reporting via communications with target WTRU(s). The WTRU may make a determination to change the rate and/or the periodicity of the measurements, reporting, and/or monitoring based on how much one or more measurements associated with the target WTRU have changed. The WTRU may send an indication to decrease the rate or the periodicity of the measurements, reporting, and/or monitoring if the WTRU determines that one or more measurements associated with the target WTRU have not changed more than a first amount over a number of periods. The WTRU may send an indication to increase the rate or the periodicity of the measurements, reporting, and/or monitoring if the WTRU determines that one or more measurements associated with the target WTRU have changed more than a second amount over the number of periods. The WTRU may make a determination to change the rate and/or periodicity of the measurements, reporting, and/or monitoring based on whether a location of the WTRU has changed more than a threshold. For example, if the location of the WTRU has changed more than the threshold, the WTRU may send an indication to the network entity to increase a rate or a periodicity of the measurements, reporting, and/or monitoring.

A measuring WTRU may perform one or more of the following, which may support neighbor assisted WRTU positioning. The measuring WTRU may receive a positioning configuration. The positioning configuration may include a sounding reference signal (SRS) pattern and an indication of the resource allocation for the SRS transmission for a reference WTRU. The measuring WTRU may receive (e.g., as part of the configuration), an indication of the reference WTRU's timing advance. The measuring WTRU may determine the downlink slot timing, for example, by detecting the primary synchronization signal/secondary synchronization signal (PSS/SSS) transmissions of a network node (e.g., a serving base station (BS)). The measuring WTRU may determine the uplink slot timing of the reference WTRU by detecting an SRS transmission from the reference WTRU. If the measuring WTRU is configured with the reference WTRU's timing advance value, the measuring WTRU may adjust the measured uplink slot timing with the timing advance. The measuring WTRU may determine the reference signal time difference (RSTD) between the downlink transmission and the uplink transmission. The measuring WTRU may report the RSTD measurement, e.g., to a positioning server (e.g., E-SMLC, SUPL SLP, LMF, etc.), which may be a physical or logical network entity.

Network-initiated WTRU group positioning techniques may be provided. One or more of the following may apply. A WTRU (e.g., an anchor WTRU) may receive a PRS transmission and reporting configuration, e.g., one or more of sidelink resources, periodicities, target WTRU IDs, threshold values, etc. The anchor WTRU may transmit a PRS on the configured resources, for example, using the sidelink channel towards one or more target WTRUs. The anchor WTRU may collect positioning measurement reports (e.g., RSTD) on the configured resources, for example, using the sidelink channel from one or more target WTRUs. If the change in the measurement value of a target WTRU (e.g., relative to previous measurement value) exceeds a first threshold, the anchor WTRU may report the measurement value to a positioning server. If the change in the measurement value (e.g., relative to a previous measurement value) exceeds a second threshold, the anchor WTRU may send a re-configuration request to increase the rate of measurement and reporting to the positioning server. If the change in the measurement value (e.g., relative to a previous measurement value) is less than a third threshold over a certain (e.g., configured) number periods, the anchor WTRU may send a re-configuration request to decrease the rate of measurements and reporting to the positioning server. If the anchor WTRU is unable perform downlink measurements on the specified number of BSs, the anchor WTRU may trigger a notification to the positioning server.

Autonomous WTRU group positioning techniques may be provided. One or more of the following may apply. An out-of-coverage WTRU may perform positioning measurements on reference signals (RSs) received from in-coverage WTRU(s) or other out-of-coverage WTRU(s). An out-of-coverage WTRU may send a report that includes the out-of-coverage WTRU's measurement results (e.g., angle of arrival (AOA), Rx-Tx time difference, RSRP, etc.) to a reference in-coverage or out-of-coverage WTRU (e.g., using pre-configured sidelink resources). The out-of-coverage WTRU may monitor for measurement reports from one or more other out-of-coverage WTRUs on the pre-configured sidelink resources. The out-of-coverage WTRU may include measurement results of other out-of-coverage WTRUs in the out-of-coverage WTRU's report to a reference WTRU. The out-of-coverage WTRU may derive the measurement results of other WTRUs with respect to the out-of-coverage WTRU's own reference (e.g., position, time, etc.) and use the derived value to send the measurement to the reference WTRU.

A WTRU may be configured to perform positioning measurements (e.g., OTDOA, A-GNSS, E-CID, etc.) in the idle state. One or more of the following may apply. The WTRU may receive a configuration of dedicated sidelink resources of one or more WTRUs to relay the positioning measurements to a positioning server. The configuration may include one or more of the following: a list of sidelink enabled WTRUs, a list of DRX cycles of the configured sidelink WTRUs, a maximum positioning measurement reporting delay, threshold values, delay reduction factor values, etc. A WTRU may perform positioning measurements on configured resources. If the positioning measurement differs from a previously reported positioning measurement value (e.g., by a value larger than a threshold), the WTRU may reduce the maximum positioning measurement delay by a configured reduction factor value. The WTRU may perform one or more of the following to send positioning measurements. If the total reporting delay using one or more of the sidelink resources is less than the maximum positioning measurement reporting delay, the WTRU may send the positioning measurements using one of the configured dedicated sidelink resources. If the configured list of sidelink enabled WTRUs is unable to satisfy the condition that the total reporting delay is less than the maximum positioning measurement reporting delay, the WTRU may determine to send the positioning measurement reports using resources from the common sidelink resource pool. The WTRU may select one of the sidelink WTRUs which may satisfy the requirements of the total reporting delay using the common resource pool. If the sidelink WTRUs in the configured list of sidelink enabled WTRUs satisfies the condition that the total reporting delay using a common resource pool is less than the reduced maximum positioning measurement reporting delay, the WTRU may determine to send the positioning measurement reports, for example, by first transitioning to the connected state.

BRIEF DESCRIPTION OF THE DRAWINGS

Furthermore, like reference numerals in the figures indicate like elements, and wherein.

DETAILED DESCRIPTION

Figure 1A:
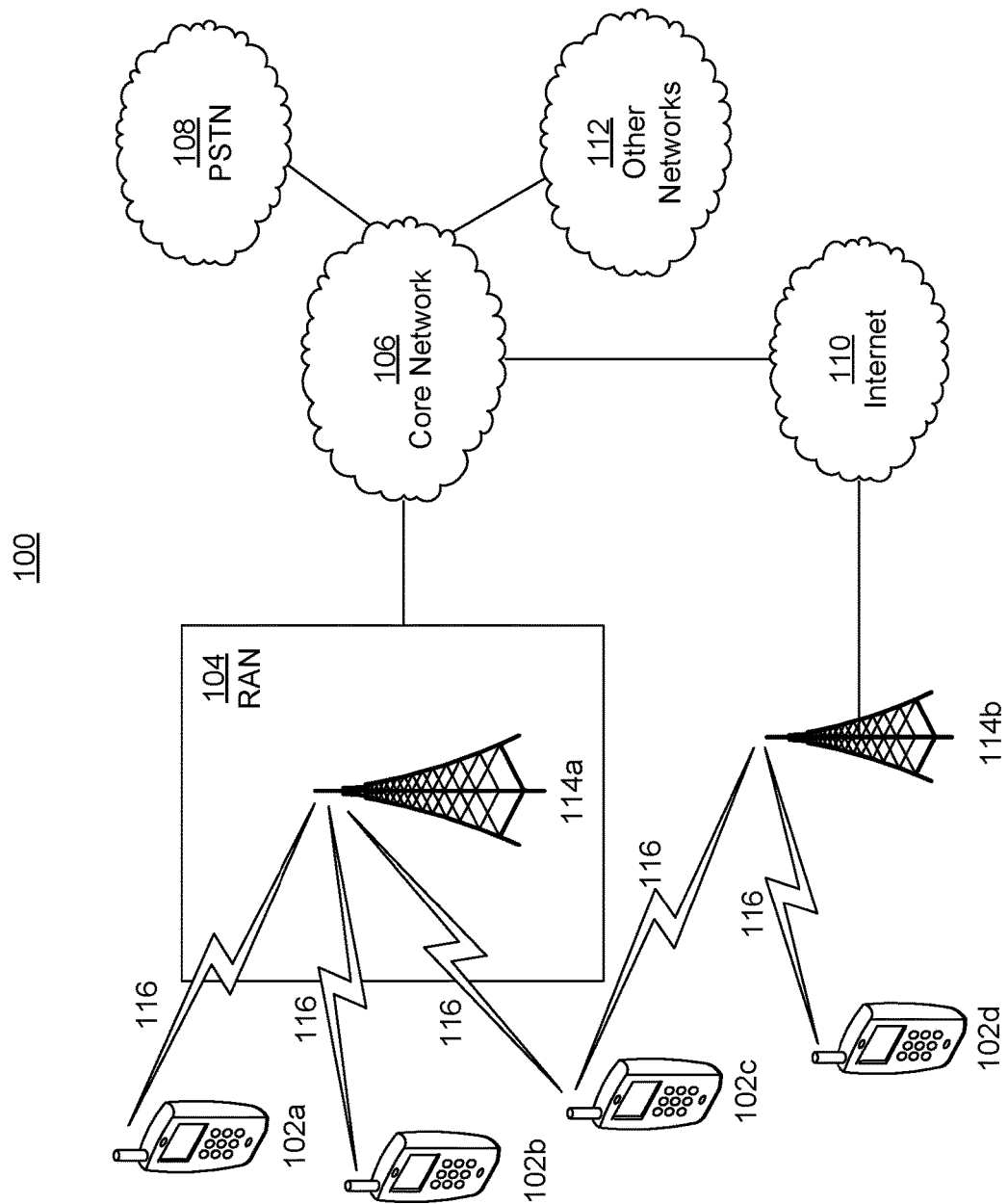
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
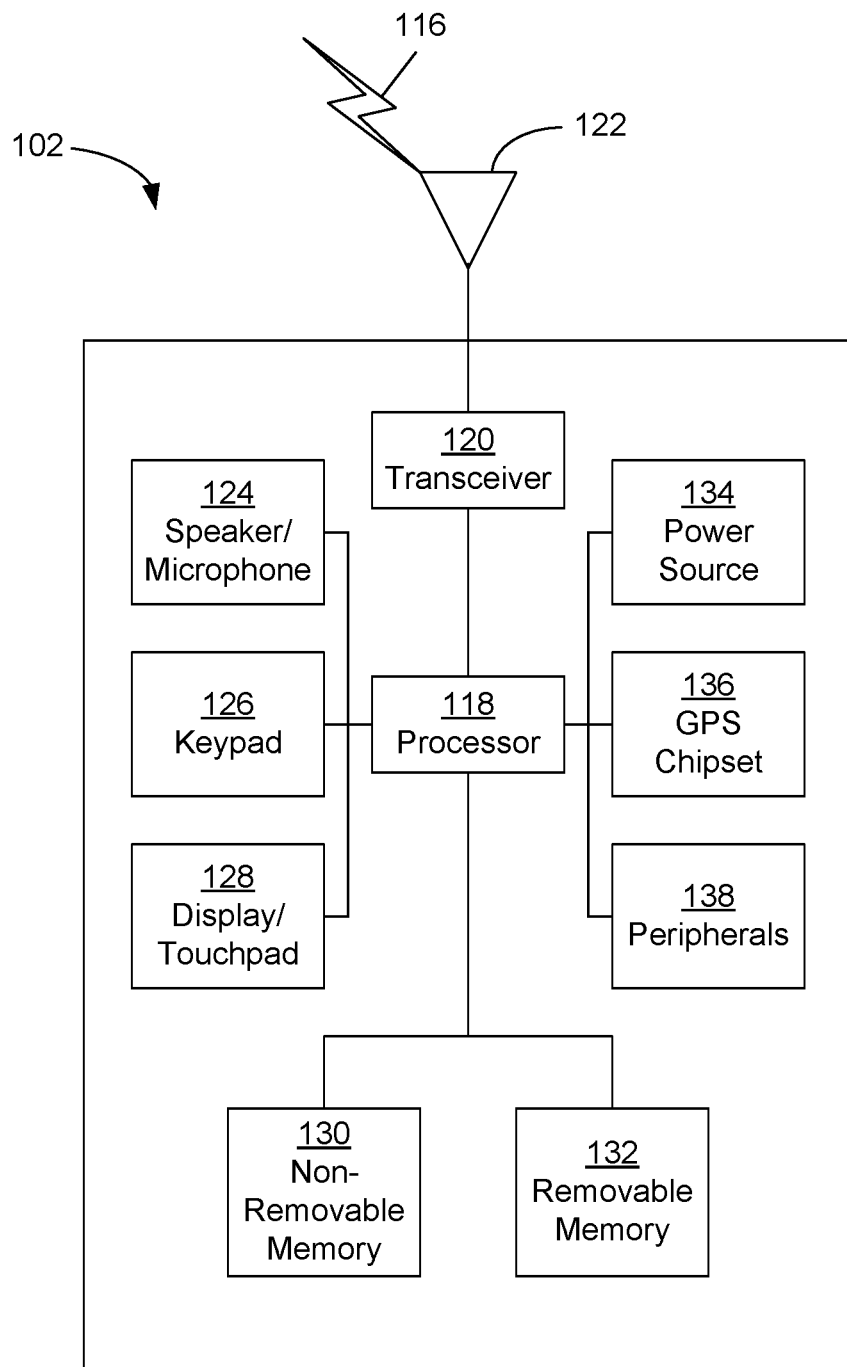
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
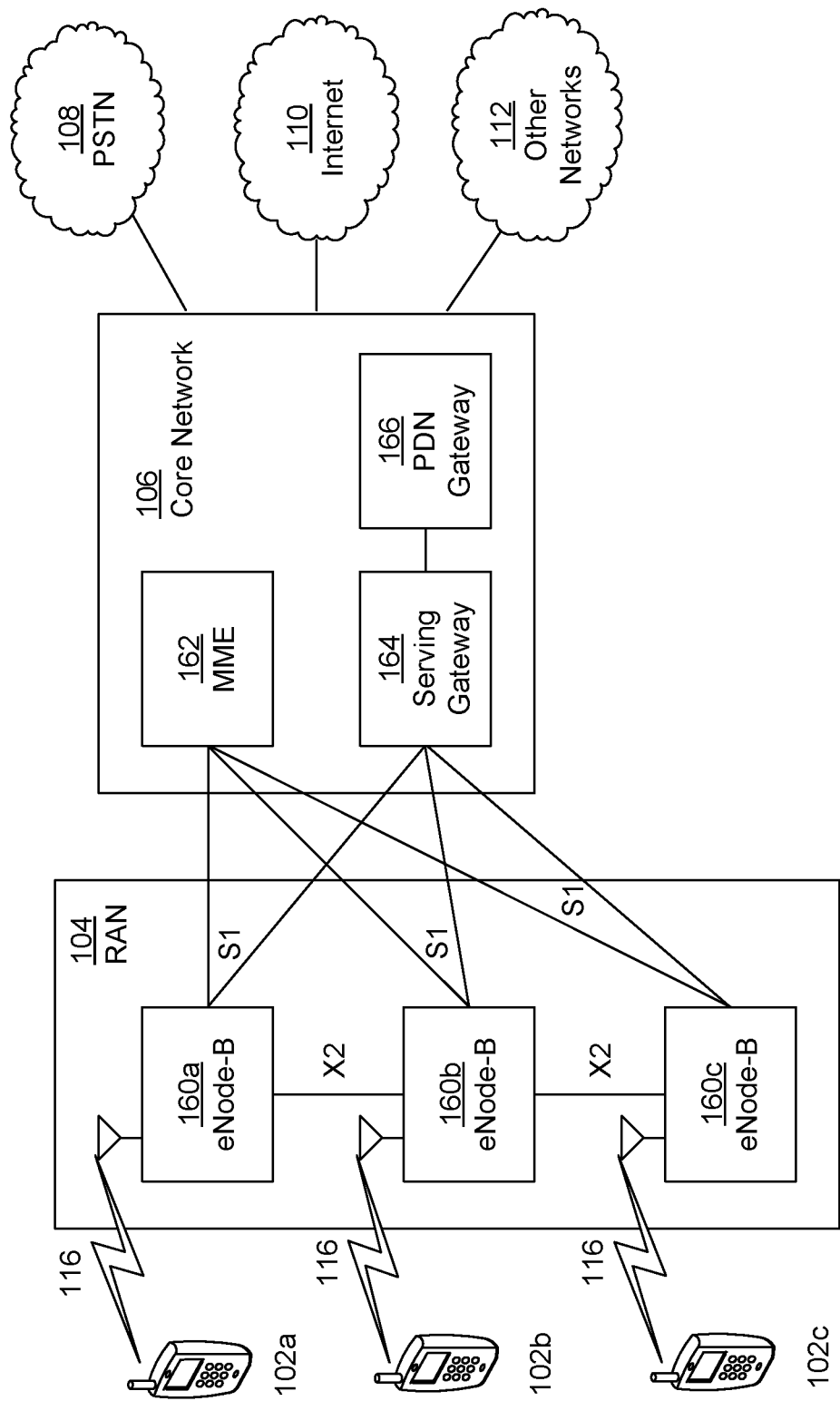
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
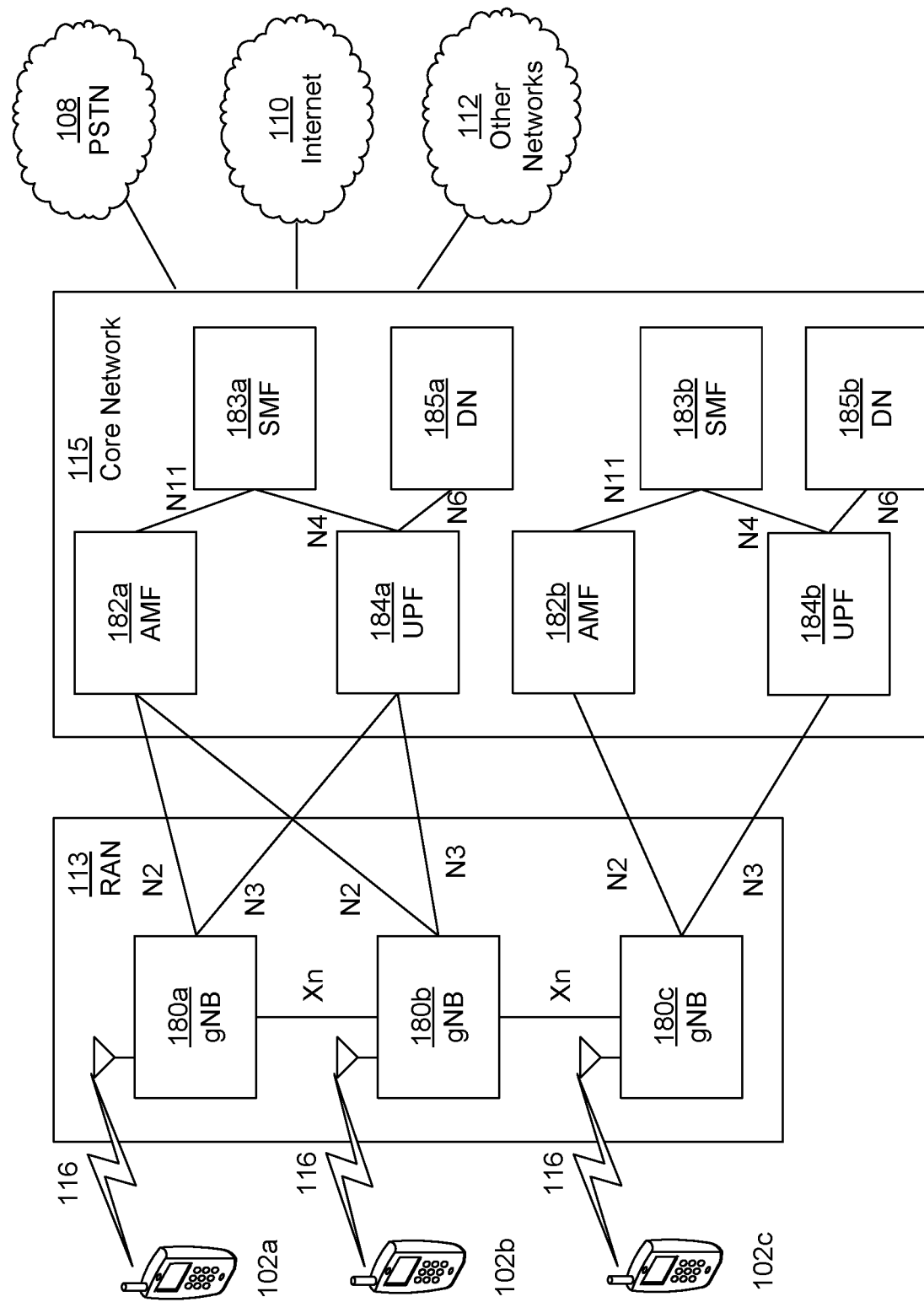
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The processes and techniques described herein may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer. In addition, although features, elements, and techniques may be described herein in particular combinations, each feature or element can be used alone or in any combination with the other features, elements, and techniques.

In certain location applications, accurate positioning may be achieved through combining multiple technologies, including: Global Navigation Satellite System (GNSS) based solutions, which may be used to provide accurate location in outdoor scenarios, radio-technologies (e.g., LTE networks, offering multiple design options to locate user, Wi-Fi networks, Terrestrial Beacon Systems (TBS), Bluetooth, etc.), Inertial Measurement Units (IMU) or sensors (e.g., tracking user position based on accelerometers, gyroscopes, magnetometers or vertical positioning by means of atmospheric pressure sensors).

Support for positioning may be provided. One or more of the following may apply to the description herein. The suffix "-based" may refer to the node that is responsible for calculating the position (e.g., the node may also provide measurements). The suffix "-assisted" may refer to the node that provides measurements and does not perform position calculations.

One or more types of positioning may be supported, which may include: WTRU positioning and network positioning.

One or more of the following may apply for WTRU positioning. A WTRU may actively support or assist in the calculation of geographical position (e.g., calculation of a WTRU's geographical position). For example, WTRU positioning may include: WTRU-assisted positioning and WTRU-based positioning. In WTRU-assisted positioning, the WTRU may perform measurements and provide the measurements to the network. The network (e.g., the enhanced serving mobile location center (E-SMLC)) may use the measurements to calculate the WTRU's position. In WTRU-based positioning, the WTRU may perform measurements and perform the position calculations itself and provide its calculated position to the network (e.g., instead of the network performing the position calculations).

One or more of the following may apply for network positioning. The network may perform measurements and/or receive signals from a WTRU to determine the WTRU's position. Positioning methods for wireless systems (e.g., LTE/LTE-A/LTE-A Pro) may include one or more of the following. The WTRU positioning methods may include: GNSS; Observed Time Difference of Arrival (OTDO), which may be referred to as "downlink positioning;" or Enhanced Cell ID (E-CID). A network positioning method may include a time difference of arrival (UTDOA), which may be referred to as "uplink positioning."

The selection of anchor WTRU(s) may be performed by a network entity, e.g., a positioning server. For example, a selection (e.g., initial selection) of anchor WTRU(s) may include the WTRU(s) for which the positions (e.g., absolute positions) are known. A list of anchor WTRU(s), for example WTRU IDs (e.g., IMSI, IMEI, etc.) may be provided to the BS, e.g., in a group formation request.

Techniques associated with GNSS may be provided. One or more of the following may apply. GNSS may be a satellite-based positioning method (e.g., which may include GPS, Galileo, GLONASS, BeiDou and others). Network-assisted GNSS may be performed using the signaling between WTRU GNSS receivers (e.g., with reduced complexity) and an operating (e.g., continuously operating) GNSS reference receiver network, which has clear sky visibility of the same GNSS constellation as the assisted WTRUs. Assisted modes may be supported.

WTRU-Assisted positioning techniques may be provided. One or more of the following may apply. The WTRU may perform GNSS measurements (e.g., pseudo-ranges, pseudo Doppler, carrier phase ranges, etc.) and the WTRU may send the GNSS measurements to the network, which may perform the position calculations.

WTRU-Based positioning techniques may be provided. One or more of the following may apply. The WTRU may perform GNSS measurements and calculate the WTRU's position location, for example, using additional measurements from other (e.g., non-GNSS) sources and assistance data from the network.

The assistance data's content may vary, for example, depending on whether the WTRU operates in WTRU-Assisted or WTRU-Based mode.

Figure 2:
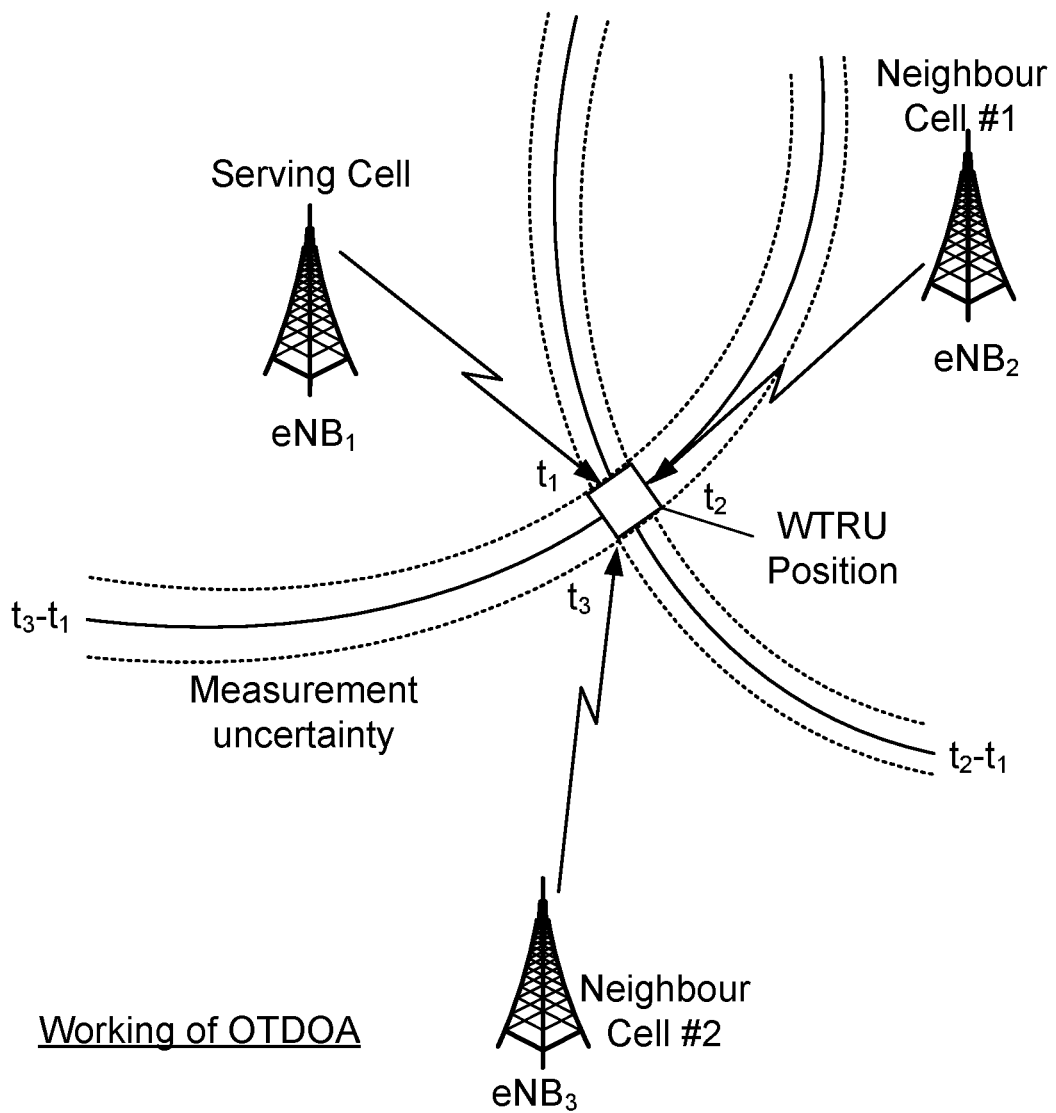
FIG. 2 illustrates an example associated with observed time difference of arrival (OTDOA)

OTDOA (e.g., Downlink positioning) techniques may be provided. One or more of the following may apply. For OTDOA, the WTRU may receive signals from a reference cell (e.g., the serving cell) and several neighbor cells, and may measure the observed time differences of arrival of the signals (e.g., between each neighbor cell and the reference cell). The WTRU may report the reference signal time differences (RSTD) back to the network. Using the locations of the cells, the fixed timing differences among them, and other information, the network may derive the WTRU's position by triangulation (e.g., assuming there are at least 3 cells measured) and/or other proprietary methods. FIG. 2 is an example associated with OTDOA, where each time difference (TDOA) determines a hyperbola. As illustrated in FIG. 2, the intersection of the hyperbolas may be the estimated location of a WTRU. At least 3 timing measurements (e.g., a reference measurement and 2 neighbor cell measurements) may be used to estimate the WTRU's coordinates.

The time difference of arrival may be measured on a known signal. The cell-specific reference symbols (CRS) may be a candidate for this measurement since they are transmitted by the cells and are known to the WTRUs. In examples, use of CRS may not be sufficient. In examples, other signals may be used, such as a Positioning Reference Signal (PRS). Given that a cell transmits the PRS, the WTRU may use the CRS and/or the PRS to determine the time difference of arrival.

E-CID based positioning techniques may be provided.

The E-CID positioning techniques may build upon the Cell ID (CID) method. CID may include a network-based positioning method in which the network uses knowledge of which cell is a WTRU's serving cell to determine the WTRU's position. The E-CID techniques may improve the accuracy of the position by combining knowledge of the cell with measurements made by the WTRU and the network, such as: measurement of the Round Trip Time (RTT), which may provide distance information; AOA/angle of departure (AOD) measurements, which may provide direction; and RSRP measurements, which may provide additional information. The E-CID positioning may be implemented using 1 to 3 base stations. As described herein, the measurements may be performed at the WTRU or at the base station and may be reported to the location server (e.g., positioning server). The calculation of a WTRU's position may be based on a calculation of the measurements, which may be performed in the network.

UTDOA (e.g., Uplink positioning) based positioning techniques may be provided.

The uplink (e.g., UTDOA) positioning techniques may be performed using the measured timing at multiple network location measurement units (LMU), which may be based on uplink signals transmitted from the WTRU. The LMU may measure the timing of the received signals using assistance data received from the positioning server, and the resulting measurements may be used to estimate the location of the WTRU.

The use cases and applications anticipated for next generation systems may include stringent location requirements, for example, as compared to existing or previous wireless systems. For example, a deployment for certain systems may be configured to support higher accuracy location capability, e.g., of 0.3 m with a positioning service latency of 10 ms.

In areas of sparse network coverage, support for WTRU positioning may be limited, for example, due to the number of base stations that a WTRU may be able to perform measurements on, which may limit the availability and reliability of relative positioning measurements like OTDOA. In scenarios involving limited relative mobility within a group of WTRUs, e.g., when WTRUs are carried on trains, performing positioning measurements for individual WTRUs may incur significant network overhead and WTRU power consumption.

A framework that enables WTRU-to-WTRU positioning measurements may provide for the support of robust WTRU positioning in environments where network coverage is sparse.

A measuring WTRU may perform one or more of the following, which may support neighbor assisted WRTU positioning. The measuring WTRU may receive a positioning configuration. The positioning configuration may include a sounding reference signal (SRS) pattern and an indication of the resource allocation for the SRS transmission for a reference WTRU. The measuring WTRU may receive (e.g., as part of the configuration), an indication of the reference WTRU's timing advance. The measuring WTRU may determine the downlink slot timing, for example, by detecting the primary synchronization signal/secondary synchronization signal (PSS/SSS) transmissions of a network node (e.g., serving base station (BS)). The measuring WTRU may determine the uplink slot timing of the reference WTRU by detecting an SRS transmission from the reference WTRU. If the measuring WTRU is configured with the reference WTRU's timing advance value, the measuring WTRU may adjust the measured uplink slot timing with the timing advance. The measuring WTRU may determine the reference signal time difference (RSTD) between the downlink transmission and the uplink transmission. The measuring WTRU may report the RSTD measurement, e.g., to a positioning server (e.g., E-SMLC, SUPL SLP, etc.).

Network-initiated WTRU group positioning techniques may be provided. One or more of the following may apply. A WTRU (e.g., an anchor WTRU) may receive a PRS transmission and reporting configuration, e.g., one or more of sidelink resources, periodicities, target WTRU IDs, threshold values, etc. The anchor WTRU may transmit a PRS on the configured resources, for example, using the sidelink channel towards one or more target WTRUs. The anchor WTRU may collect positioning measurement reports (e.g., RSTD) on the configured resources, for example, using the sidelink channel from one or more target WTRUs. If the change in the measurement value of a target WTRU (e.g., relative to previous measurement value) exceeds a first threshold, the anchor WTRU may report the measurement value to a positioning server. If the change in the measurement value (e.g., relative to a previous measurement value) exceeds a second threshold, the anchor WTRU may send a re-configuration request to increase the rate of measurement and reporting to the positioning server. If the change in the measurement value (e.g., relative to a previous measurement value) is less than a third threshold over a certain (e.g., configured) number periods, the anchor WTRU may send a re-configuration request to decrease the rate of measurements and reporting to the positioning server. If the anchor WTRU is unable perform downlink measurements on a specified number of BSs, the anchor WTRU may trigger a notification to the positioning server.

Autonomous WTRU group positioning techniques may be provided. One or more of the following may apply. An out-of-coverage WTRU may perform positioning measurements on reference signals (RSs) received from in-coverage WTRU(s) or other out-of-coverage WTRU(s). An out-of-coverage WTRU may send a report that includes the out-of-coverage WTRU's measurement results (e.g., angle of arrival (AOA), Rx-Tx time difference, RSRP, etc.) to a reference in-coverage or out-of-coverage WTRU (e.g., using pre-configured sidelink resources). The out-of-coverage WTRU may monitor for measurement reports from one or more other out-of-coverage WTRUs on the pre-configured sidelink resources. The out-of-coverage WTRU may include measurement results of other out-of-coverage WTRUs in the out-of-coverage WTRU's report to a reference WTRU. The out-of-coverage WTRU may derive the measurement results of other WTRUs with respect to the out-of-coverage WTRU's own reference (e.g., position, time, etc.) and use the derived value to send the measurement to the reference WTRU.

A WTRU may be configured to perform positioning measurements (e.g., OTDOA, A-GNSS, E-CID, etc.) in the idle state. One or more of the following may apply. The WTRU may receive a configuration of dedicated sidelink resources of one or more WTRUs to relay the positioning measurements to a positioning server. The configuration may include one or more of the following: a list of sidelink enabled WTRUs, a list of DRX cycles of the configured sidelink WTRUs, a maximum positioning measurement reporting delay, threshold values, delay reduction factor values, etc. A WTRU may perform positioning measurements on configured resources. If the positioning measurement differs from a previously reported positioning measurement value (e.g., by a value larger than a threshold), the WTRU may reduce the maximum positioning measurement delay by a configured reduction factor value. The WTRU may perform one or more of the following to send positioning measurements. If the total reporting delay using one or more of the sidelink resources is less than the maximum positioning measurement reporting delay, the WTRU may send the positioning measurements using one of the configured dedicated sidelink resources. If the configured list of sidelink enabled WTRUs is unable to satisfy the condition that the total reporting delay is less than the maximum positioning measurement reporting delay, the WTRU may determine to send the positioning measurement reports using resources from the common sidelink resource pool. The WTRU may select one of the sidelink WTRUs which may satisfy the requirements of the total reporting delay using the common resource pool. If none of the sidelink WTRUs in the configured list of sidelink enabled WTRUs satisfies the condition that the total reporting delay using a common resource pool is less than the reduced maximum positioning measurement reporting delay, the WTRU may determine to send and/or send the positioning measurement reports, for example, by first transitioning to the connected state.

Figure 3:
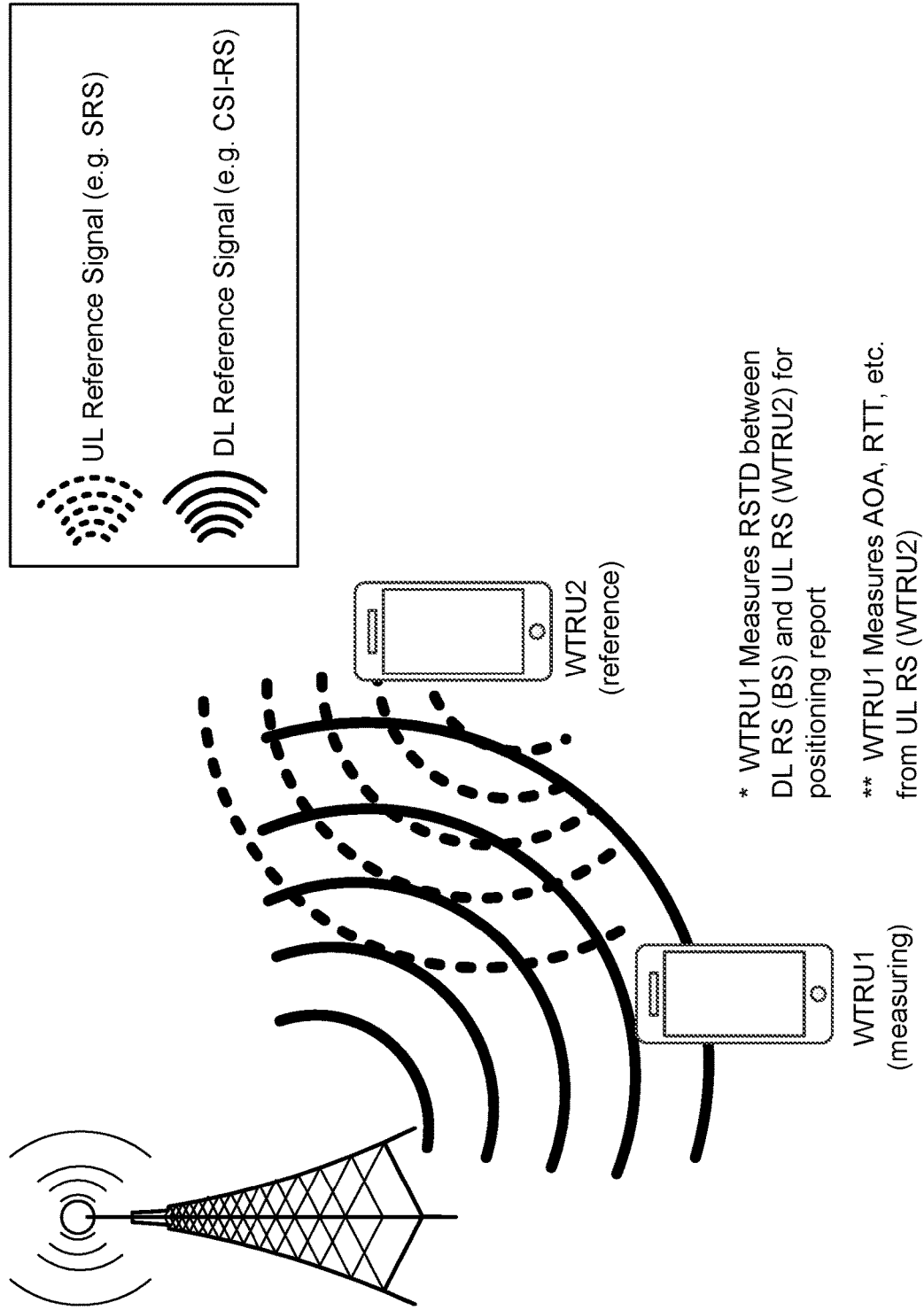
FIG. 3 illustrates an example associated with interference-based positioning.

Neighbor assisted WTRU positioning techniques may be performed. One or more of the following may apply. A WTRU may be configured to perform multi-node positioning measurements. For example, the nodes may include a base stations (BSs), e.g., gNBs/eNBs/TRPs and WTRUs. OTDOA measurements may be performed, where the measurements may include reference signals transmitted by neighboring WTRU's and/or serving/neighboring BSs, (e.g. rather than exclusively from serving/neighboring BSs). FIG. 3 illustrates an example associated with interference based positioning.

WTRUs may be configured to perform neighbor assisted WTRU positioning.

Configuration of a reference WTRU may be provided. One or more of the following may apply. A WTRU (e.g., a reference WTRU, as used herein) may be configured to transmit a PRS (e.g., SRS, contention-free/contention-based RACH preamble, a WTRU-specific or non-WTRU-specific pseudo-random sequence, new reference signals dedicated for the purpose of positioning, etc.). The WTRU may be configured to generate a reference signal (e.g., pseudo-random sequence generation algorithm, and seed, sequence length, etc.). The WTRU may be configured with a resource allocation for the PRS (e.g. schedule of the PRS transmission, PRS periodicity, PRS offset, repetition, time/frequency allocation of reference signal (RS) symbols, etc.). The WTRU may be configured to transmit the PRS in a specific direction (e.g., angular offset from serving beam, etc.). The WTRU may be configured to repeat the transmission on a set of beams (e.g., repeat the PRS pattern for each of the N successive slots on N successive beams, etc.). The WTRU may be configured to transmit the PRS at a certain power (e.g., X dB above or below PDSCH EPRE, etc.). The reference WTRU may be configured to transmit the PRS in a certain RACH resource (e.g., on a certain RACH occasion, X). The WTRU may be configured with a timing advance value unique for transmission of the PRS.

One or more of the following may apply for the configuration of a measuring WTRU. A WTRU (e.g., a "measuring WTRU," as used herein) may be configured to perform an OTDOA measurement on a signal transmission, for example, between a BS and a reference WTRU. The measuring WTRU may be configured via signaling (e.g., dedicated signaling, such as RRC signaling). The WTRU may be configured to detect the PRS of the reference WTRU (e.g., pseudo-random sequence generation algorithm, and seed, sequence length, etc.). The measuring WTRU may be configured with the scheduled resources for the PRS transmission from the reference WTRU (e.g., time/frequency resources, slot index, sub-frame index, MBSFN, RACH occasion, etc.). The measuring WTRU may be configured with guard resources, which may be used limit interference with multiplexed data transmissions. The measuring WTRU may be configured to receive PRS transmissions from a reference WTRU on a beam (e.g., a specific beam or set of beams). The measuring WTRU may be configured to select (e.g., autonomously select) the beam on which the reference WTRU's PRS transmission is received.

Neighbor assisted positioning measurements may be performed.

Time synchronized PRS positioning measurements may be performed. One or more of the following may apply. A measuring WTRU may be configured to determine the slot timing of a BS, for example, based on the detection of a downlink PRS (e.g., PSS/SSS transmissions, etc.), which may be sent by a BS (e.g. serving, or neighboring). In examples, the measuring WTRU may determine the slot timing of the reference WTRU by receiving transmission of the reference WTRU's uplink PRS transmission. The measuring WTRU may determine the OTDOA, for example, by comparing the relative offset between a BS's downlink slot timing and the reference WTRU's uplink slot timing (e.g., RSTD measurement). The measuring WTRU may determine the angular difference of PRS arrival based on the received direction of the BS's downlink PRS and the reference WTRU's uplink PRS.

Figure 4:
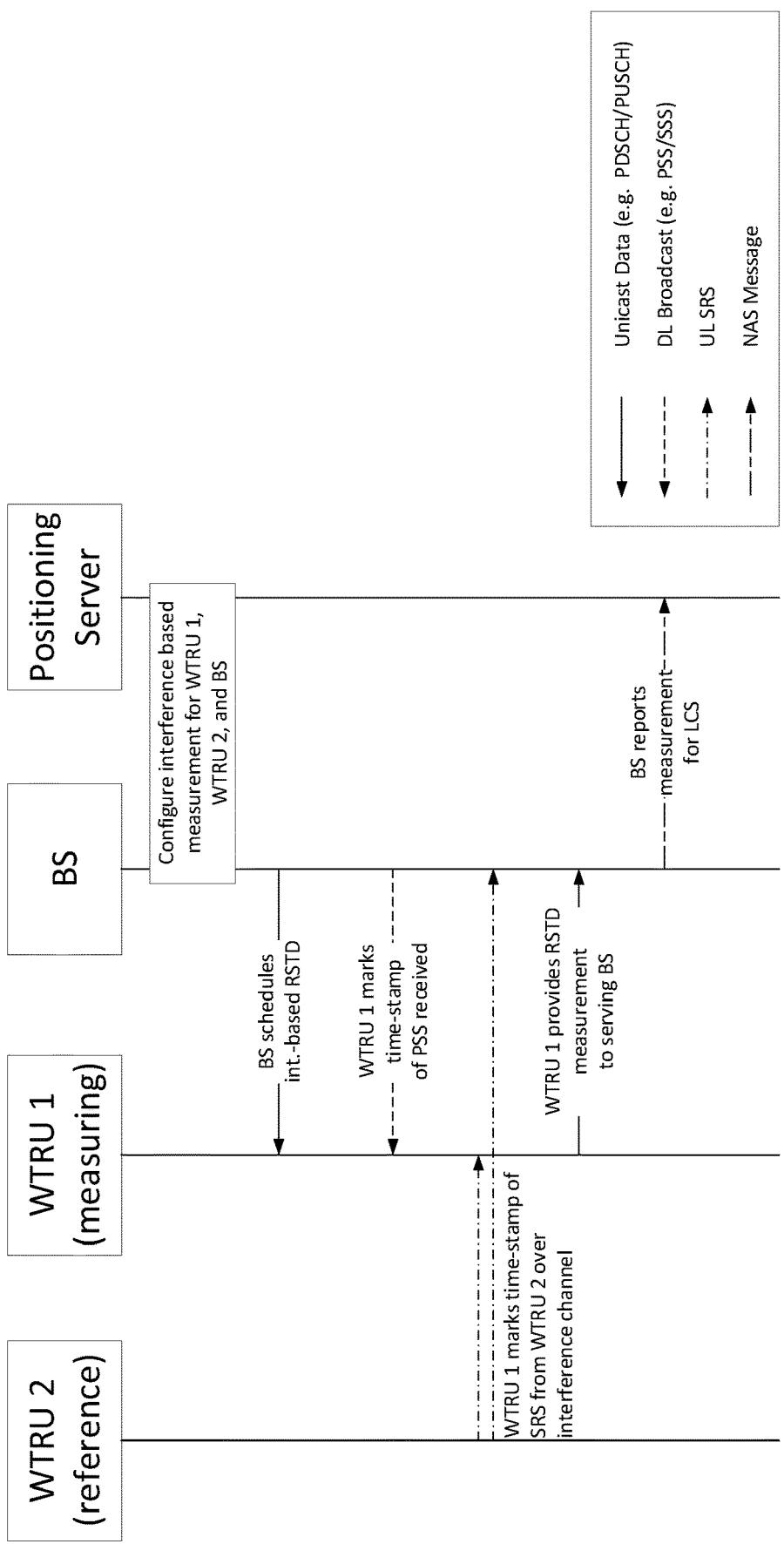
FIG. 4 illustrates an example associated with time synchronized positioning measurements.

An example illustration of timing synchronized PRS positioning measurement is shown in FIG. 4. As illustrated in FIG. 4, a reference WTRU may be configured to send periodic SRS transmissions, which the measuring WTRU may use as PRS transmissions for WTRU-assisted positioning measurements. The measuring WTRU may be configured with parameters to detect the reference WTRU's SRS transmission. In examples, the configuration may include parameters for generating the SRS pattern, parameters for the resource allocation for the SRS pattern, and parameters for the periodicity and offset of the SRS transmission (e.g., within the frame schedule). The measuring WTRU may be configured with the reference WTRU's timing advance, which may limit the search for detecting the SRS transmission by the measuring WTRU. The measuring WTRU may recover the slot timing for the downlink, for example, by detecting the PSS/SSS transmissions of the serving BS. The measuring WTRU may determine the slot timing for the reference WTRU's uplink by detecting the SRS transmission of the reference WTRU. The WTRU may determine the RSTD between the downlink and uplink transmission. The WTRU may report the RSTD measurements to a positioning server (e.g., E-SMLC, SUPL SLP, etc.), for example, via a serving BS.

Asynchronous positioning measurements may be performed. One or more of the following may apply. A measuring WTRU may be configured to determine the slot timing of a BS, for example, by detecting the downlink PRS transmission of a BS (e.g. serving or neighboring BS). A reference WTRU may be configured to perform a PRS transmission in a random access or contention based resource (e.g., a PRACH resource). The measuring WTRU may determine the slot timing of the reference WTRU by receiving transmission of the WTRU's uplink PRS transmission in the contention based resource. In the event of collision of the PRS transmission with other random access transmissions, the WTRU may indicate to the serving BS that a collision has occurred or the received PRS was detected with parameters out-of-bounds. In the event that no collisions occurred, the WTRU may determine the OTDOA from comparing the relative offset between the BS's downlink slot timing and the WTRU's uplink slot timing (e.g., RSTD measurement). The WTRU may (e.g., also) determine the angular difference of PRS arrival based on the received direction of both the BS's downlink PRS, and the WTRU's uplink PRS.

Figure 5:
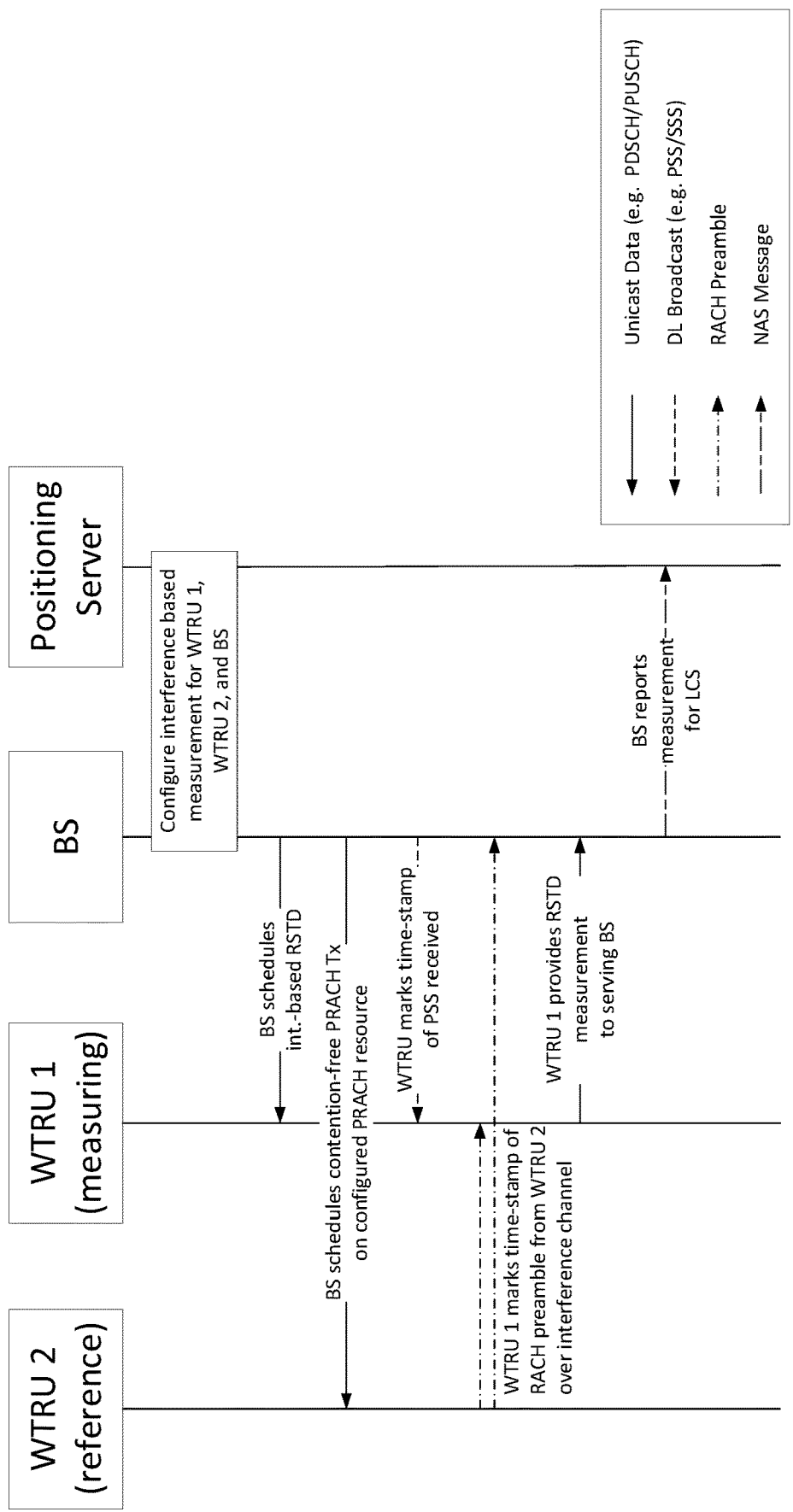
FIG. 5 illustrates an example associated with asynchronous positioning measurements.

An example of asynchronous PRS positioning measurement is illustrated in FIG. 5. As illustrated in FIG. 5, a reference WTRU may be configured to make a contention-free PRACH preamble transmission in a configured PRACH resource, which the measuring WTRU may use as the PRS transmissions for WTRU-assisted positioning measurements. The measuring WTRU may be configured with parameters to detect the reference WTRU's RACH preamble transmission. In examples, the configuration may include parameters for generating the RACH preamble, parameters for determining the resource allocation for the PRACH (e.g., including guard bands and cyclic prefix (CP) durations), and/or parameters for determining the periodicity and offset of the PRACH resource (e.g., within the frame schedule). The measuring WTRU may be configured with the reference WTRU's timing advance, which may be used to limit the search for detecting the RACH preamble transmission of the measuring WTRU. The measuring WTRU may recover the slot timing for the downlink by detecting the PSS/SSS transmissions of the serving BS. The measuring WTRU may determine the slot timing for the reference WTRU's uplink transmission, for example, by detecting the RACH preamble transmission. The WTRU may determine the RSTD between the downlink transmission and the uplink transmission. The WTRU may report the RSTD measurement to the positioning server (e.g., via the serving BS).

PRS activation/deactivation techniques may be provided. One or more of the following may apply. A reference WTRU's PRS transmissions may be configured as aperiodic, semi-periodic, or periodic. Configuration of the reference WTRU's PRS transmissions may be performed by higher layer configuration (e.g., RRC, NRPP, etc.). In examples, the reference WTRU may be provided with a PRS transmission configuration that is activated/de-activated by higher layer signaling (e.g. RRC, NRPP, etc.). The reference WTRU may be provided with a PRS transmission configuration that is activated/de-activated by lower layer control signaling (e.g. MAC-CE, DCI, etc.) The reference WTRU's PRS transmission may be configured (e.g., exclusively configured) by lower layer signaling (e.g., DCI, etc.).

The measurement performed by a measuring WTRU may be reported by the measuring WTRU. One or more of the following may apply. A measuring WTRU may be configured to send a report that includes a single WTRU-assisted positioning measurement or multiple positioning measurements. The measurement report configuration may include parameters that indicate the reference sources (e.g., nodes or entities, such as BSs or WTRUs) used for producing the measurement (e.g. BS(PSSS)/UE(SRS), UE(PRACH)/UE (SRS), etc.). The measurement report may be configured as aperiodic, semi-periodic, or periodic. The measurement report may be configured by higher layer control signaling (e.g., RRC, NRPP, etc.). The measurement report may be activated/de-activated by higher layer control-signaling (e.g., RRC, NRPP, etc.). The measurement report may be configured by higher layer control signaling and/or activated/de-activated by lower layer control signaling (e.g. MAC-CE, DCI, etc.). The measurement report may be scheduled and configured (e.g., exclusively configured) by lower layer signaling (e.g., DCI). The measurement report may include one or more measurements that may be used for the calculation of WTRU positioning (e.g., received PRS power, RSTD, RTT, BS angle-of-arrival, reference WTRU angle-of-arrival, etc.). Measurement reporting may be configured according to a schedule, which may be maintained by a serving BS (e.g., MBSFN, sub-frame number, slot number, etc.). The measurement report schedule may be determined based on the occurrence of an event (e.g., measurement reports may be scheduled within N slots of the RSTD measurement, etc.).

WTRU group positioning techniques may be provided.

Network-initiated WTRU group positioning techniques may be provided. One or more of the following may apply. To perform WTRU group positioning, one or more WTRUs may be configured to send reference signals, (e.g., PRSs dedicated for WTRU positioning, synchronization signals, DMRS in a broadcast channel, CSI-RS, etc.) on the sidelink. The WTRUs may be referred to herein as anchor WTRUs. The target WTRUs (e.g., the WTRUs for which the positions are estimated, which may be referred to herein as non-anchor WTRUs or target WTRUs) may be configured to perform measurements (e.g., RSRP, Time of arrival (TOA), Angle of Arrival (AOA), RSTD, Time difference of arrivals (TDOA), etc.) on the reference signals, which may be transmitted by one or more anchor WTRUs, e.g., on the sidelink channel. The selection and configuration of anchor WTRUs may be performed by the network (e.g., positioning server/serving BS). For example, a selection (e.g., an initial selection) of anchor WTRUs may include the WTRUs for which the absolute positions are known. In examples, the position of the respective WTRUs may be updated based on the group formation techniques described herein. The assignment of anchor WTRU(s) to target WTRUs may be performed by the network (e.g., a positioning server or a serving BS). A target WTRU may be assigned one or more anchor WTRUs. The anchor WTRUs (e.g., each anchor WTRU) may be assigned to one more target WTRUs. A collection of one or more anchor WTRUs and one or more target WTRUs that share similar (e.g., mutual) assignments or mappings and do not share similar (e.g., mutual) assignments with other target WTRUs or anchor WTRUs may be a group.

Figure 6:
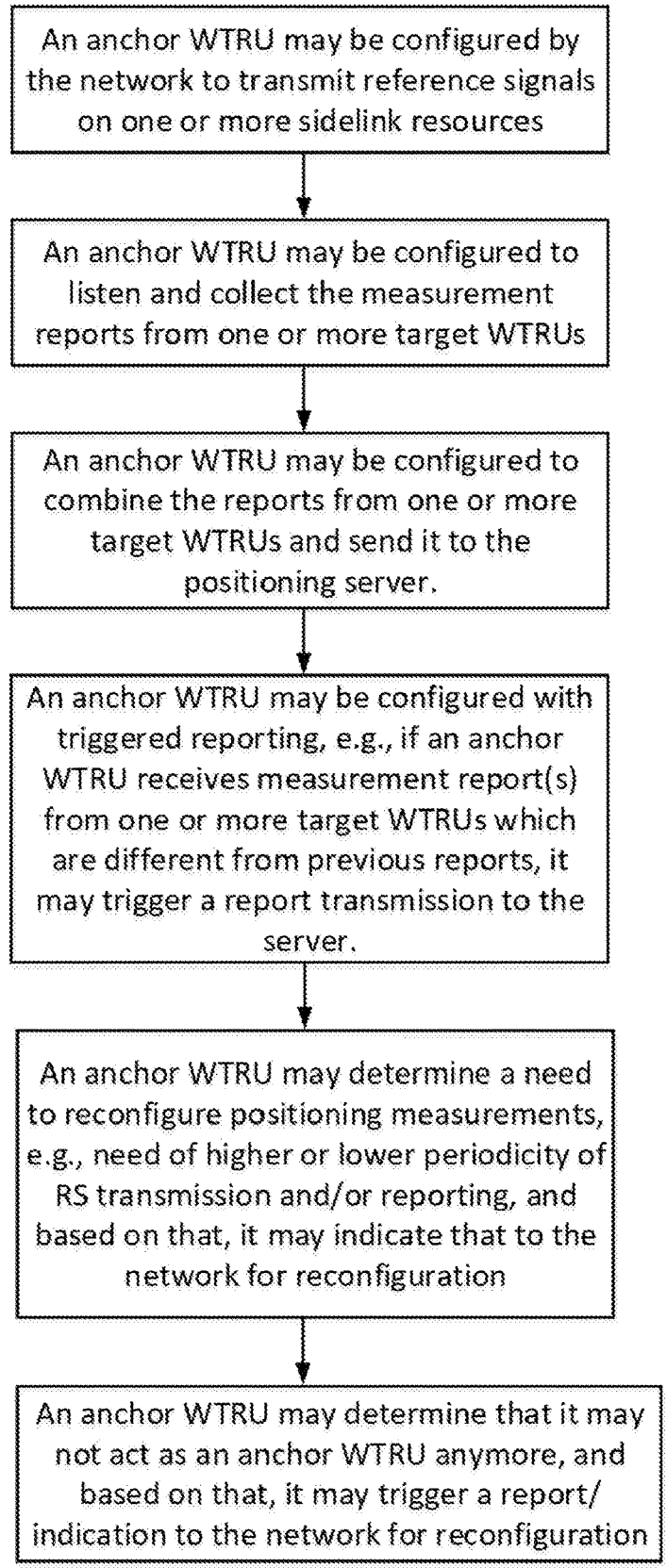
FIG. 6 illustrates an example associated with an anchor WTRU.

FIG. 6 illustrates an example associated with techniques that may be performed by an anchor WTRU.

Figure 7:
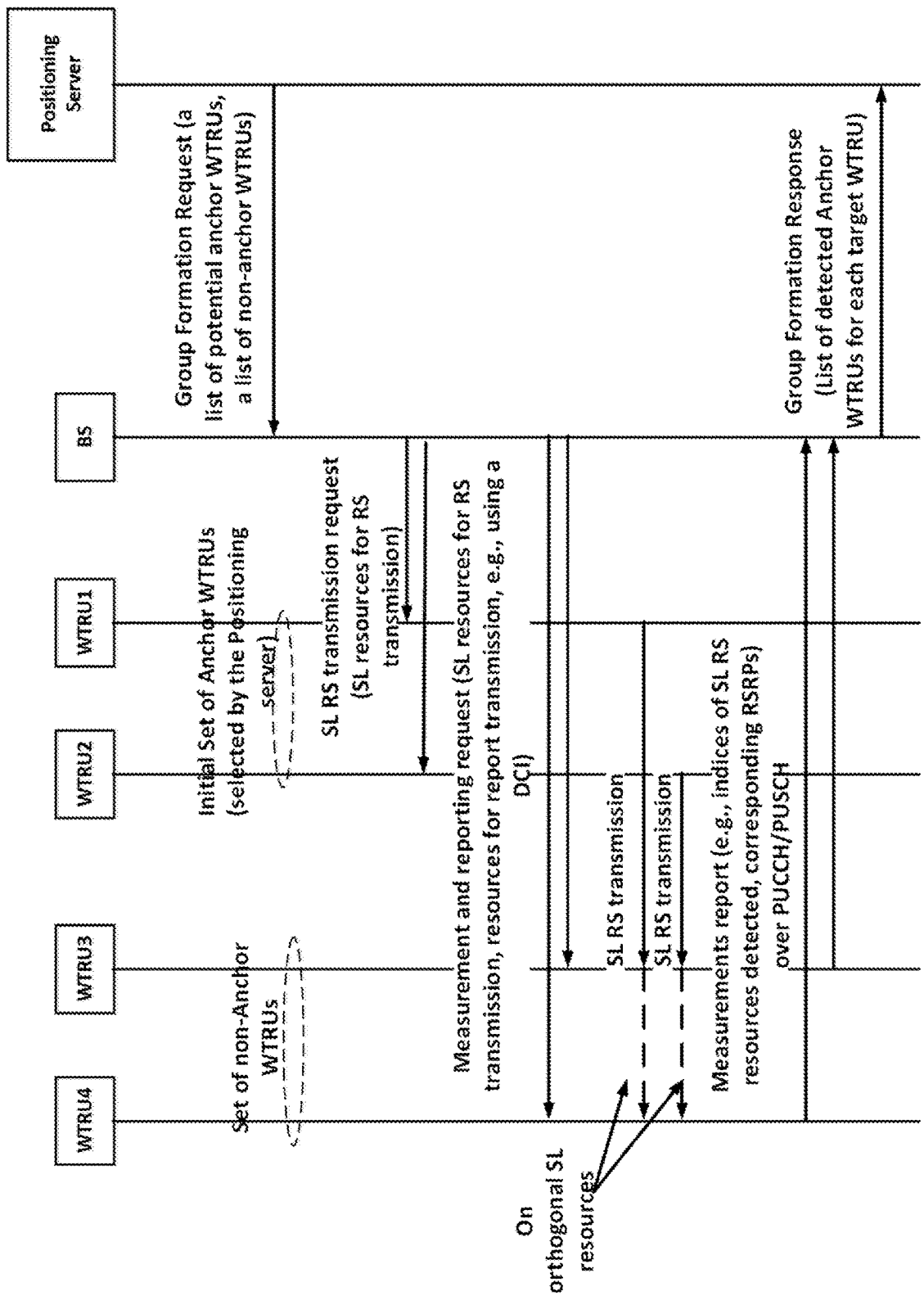
FIG. 7 illustrates an example associated with WTRU group formation.

WTRU group formation and management may be performed. One or more of the following may apply. A WTRU group formation may be initiated, for example, by the positioning server. In examples, a WTRU group formation may be initiated in order to determine the anchor WTRUs for the respective target WTRUs (e.g., each of the target WTRUs). The WTRU group formation may be repeated, for example, to account for changes in the network (e.g., due to movement of WTRU). In examples, the WTRU group formation may be performed if the positioning measurement(s) from an anchor WTRU changes by an amount larger than a threshold. In examples, the WTRU group formation may be performed if the positioning measurements from one or more target WTRUs changes by an amount larger than another threshold. The WTRU group formation may be repeated at time interval(s) that are different than time interval(s) for positioning measurement and reporting, for example group formation may be performed less frequently (e.g., rate of repetition) than the positioning measurement and reporting. FIG. 7 illustrates an example associated with WTRU group formation, which may include one or more of the actions illustrated.

In examples, a WTRU group formation may be triggered at a BS, for example, if the BS receives a group formation request from a positioning server. The group formation request may include one or more the following fields: a list of WTRUs each with WTRU ID (e.g., IMSI, IMEI, etc.); respective role(s) (e.g., Anchor/Target WTRU) of the WTRUs, an indication of the number of transmissions; an indication of the measurement type (SL SS RSRP, DMRS, sidelink PRSs, etc.); an indication of the measurement threshold, T (e.g., minimum RSRP, etc.); or a reporting format (e.g., individual, average, N max values, values exceeding threshold T, etc.).

ABS may configure the anchor WTRU(s) and the target WTRU(s), e.g., if the BS receives a group formation request.

A WTRU may be configured as an anchor WTRU (e.g., by a network entity, such as a gNB, eNB, base station, etc.). One or more of the following may apply.

A WTRU (e.g., an anchor WTRU) may transmit reference signals (e.g., sidelink synchronization signals, such as, PSSS, SSSS, or DMRS in PSBCH, or sidelink CSI-RS, or sidelink PRSs, etc.), for example, over the sidelink (e.g., a sidelink channel), e.g., for the purpose of group formation. The configuration for reference signal transmissions may be provided to the WTRU (e.g., by the network entity). In examples, the reference signal transmission configuration may include one or more of the following: a sidelink configuration (e.g., time and/or frequency resources) to transmit the reference signals (e.g., sidelink synchronization signals, such as, PSSS, SSSS, or DMRS in PSBCH, or sidelink CSI-RS, or sidelink PRSs, etc.); an indication of a slot, symbol, and/or sub-frame offset; an indication of a periodicity (e.g., over which the transmission may be repeated); an indication of a number of transmissions; transmit power; spatial information (e.g., number of beams, beam IDs, etc.); or a unique masking or scrambling sequence.

The configuration for reference signal transmission may be received in a downlink control channel and/or DCI, which may be masked or scrambled (e.g., CRC scrambled) with a sidelink-RNTI (e.g., SL-RNTI). An identity (e.g., a new identity) may be allocated by a BS (e.g., serving BS) for this purpose, which may be local to an MME or positioning server, e.g., a sidelink positioning group RNTI (e.g., SL-PG-RNTI). The configuration for reference signal transmission may be received in downlink shared channel, where, the resources for the shared channel may be indicated in DCI (e.g., scrambled with SL-PG-RNTI or SL-RNTI). The configuration may be included in higher layer parameters (e.g., RRC) and may be activated dynamically using downlink MAC-CE or DCI (e.g., scrambled with SL-RNTI or SL-PG-RNTI).

The selection of anchor WTRU(s) may be performed by a network entity, e.g., a positioning server. For example, a selection (e.g., initial selection) of anchor WTRU(s) may include the WTRU(s) for which the positions (e.g., absolute positions) are known. A list of anchor WTRU(s), for example, WTRU IDs (e.g., IMSI, IMEI, etc.) may be provided to the BS, e.g., in a group formation request.

A WTRU may be configured as a target WTRU. One or more of the following may apply.

For the purpose of group formation, a WTRU (e.g., target WTRU) may monitor for reference signals over a sidelink channel (e.g., which may be sent via sidelink synchronization signals, such as, PSSS, SSSS, or DMRS in PSBCH, or sidelink CSI-RS, or sidelink PRSs, etc.) from one or more anchor WTRUs. The target WTRU may perform measurements (e.g., RSRP) on the reference signals received over the sidelink. The target WTRU may be configured with the reference signals via a measurement configuration, e.g., a measurement configuration received from a BS. The measurement configuration may include one or more of the following: a sidelink configuration (e.g., time and/or frequency resources) to receive reference signals from one or more anchor WTRUs; an indication of a slot, symbol, and/or sub-frame offset; an indication of a periodicity over which the transmission may be repeated; an indication of a number of transmissions; an indication of a measurement type (e.g., SL SS RSRP, DMRS, sidelink PRSs, etc.); a measurement threshold, T (e.g., minimum RSRP, etc.); an indication of a reporting format (individual, average, N max values, values exceeding threshold T, etc.); spatial information (e.g., number of beams, beam IDs, etc.); a (e.g., unique) masking or scrambling sequence for the anchor WTRU(s) (e.g., each anchor WTRU); or an indication of the uplink configuration (e.g., time and/or frequency resources over PUCCH or PUSCH) on which to report measurements.

The target WTRU may be configured with a number of measurements (e.g., N measurements) to perform and report, e.g., for a period. The target WTRU may be configured to perform measurements for each period and report the measurement with the highest RSRP measured over each respective period. The target WTRU may be configured with conditional reporting. For example, the target WTRU may be configured with an RSRP threshold, and the measurement report may include the measurements for which the measured RSRP is above the given RSRP threshold. The target WTRU may be configured with the uplink resource(s) (e.g., PUCCH or PUSCH) on which to report the measurements.

The measurement configuration (e.g., sidelink configuration to receive reference signals, uplink configuration to report measurements, number of measurements to report, and/or conditional reporting configuration) may be received from a BS (e.g., serving BS) via a downlink control channel or DCI, which may be masked or scrambled (e.g., CRC scrambled), for example, with a SL-RNTI or SL-PG-RNTI. The measurement configuration may be received via a downlink shared channel, where, for example, the resources for the shared channel may be indicated in DCI (e.g., scrambled with SL-PG-RNTI or SL-RNTI). A measurement configuration for the reference signals may be included in higher layer parameters (e.g., RRC). The DCI associated with the measurement configuration may be scrambled with a SL-RNTI or SL-PG-RNTI, and may include (e.g., may only include) a resource identification to activate the measurements on the corresponding resources.

A target WTRU may be selected. The selection of target WTRU(s) may be performed by a positioning server (e.g., target WTRU(s) may be WTRU(s) for which positions need to be and/or are to be estimated) and provided to a BS, for example, in a group formation request.

If a target WTRU performs measurements using the reference signals from one or more anchor WTRU(s), the target WTRU may (e.g., for each configured period) prepare and/or send a measurement report. The measurement report may include an indication (e.g., a respective indication) of the respective reference signal(s) (e.g., serial number, if the multiple reference signals are configured, such as from multiple anchor WTRUs) and the estimated RSRP (e.g., respective RSRP) of the respective reference signal(s). A target WTRU may prepare a measurement report that includes an indication (e.g., a respective indication) of the respective reference signals (e.g., may be limited to include an indication (e.g., respective indication) of the respective reference signal(s) from anchor WTRU(s) that have an RSRP that is greater than a configured threshold). A target WTRU may prepare a measurement report with N (e.g., if configured) number of reference signal identifications and corresponding RSRPs, where, for example, the N number of reference signals with highest RSRP are included in the measurement report.

A target WTRU may send a measurement report (e.g., on a configured uplink resources) to a BS (e.g., serving BS), for example in association with setting up anchor/target WTRUs. The BS may forward the report of the respective target WTRUs (e.g., each target WTRU) to a positioning server. The positioning server may update the list of anchor WTRUs for each of the respective target WTRUs. For example, for a target WTRU, a WTRU may be considered an anchor WTRU of the target WTRU if the RSRP measured by the target WTRU on that anchor WTRU's reference signal is above a threshold.

Figure 8:
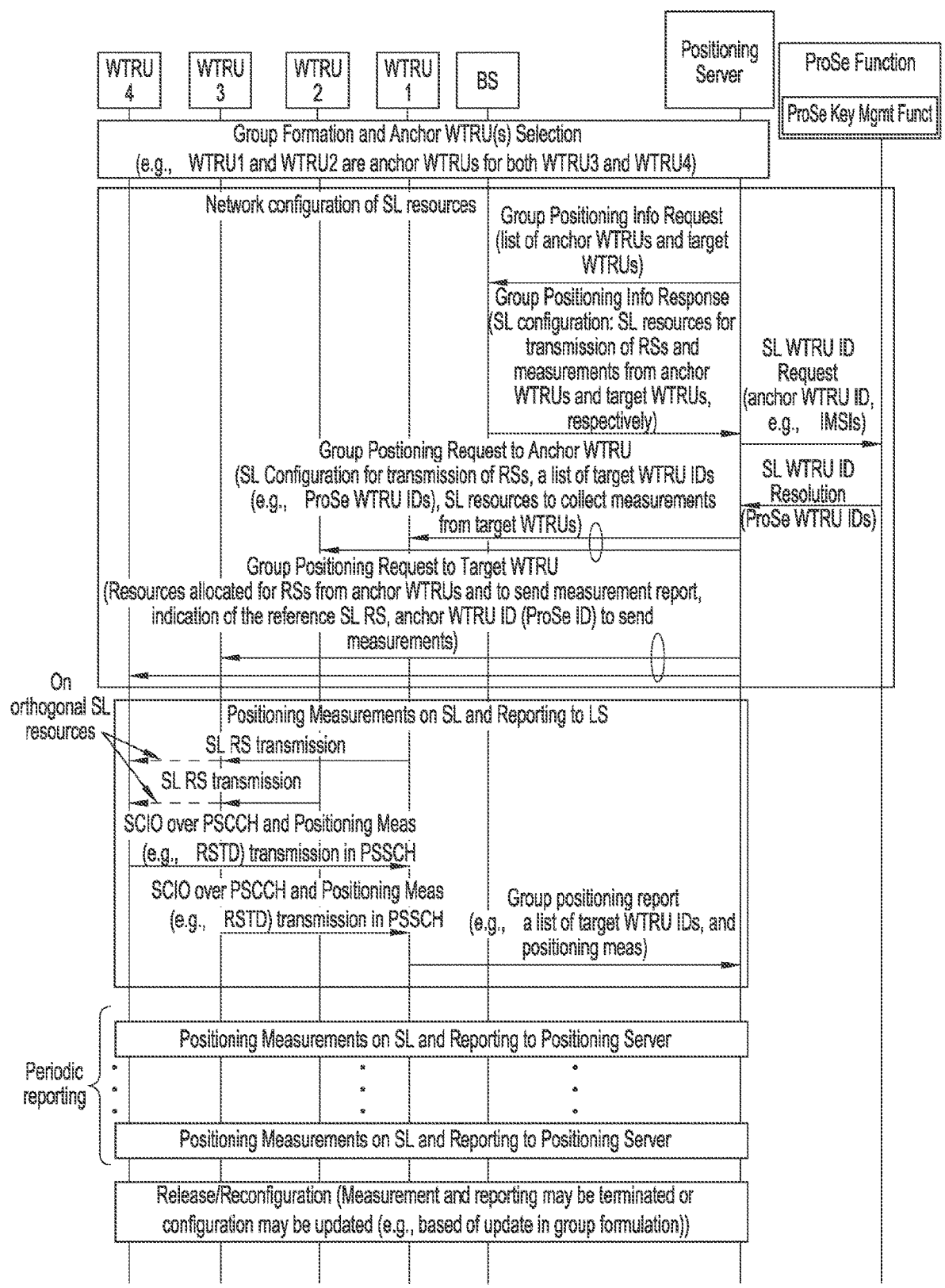
FIG. 8 illustrates an example associated with WTRU group positioning.
Figure 9:
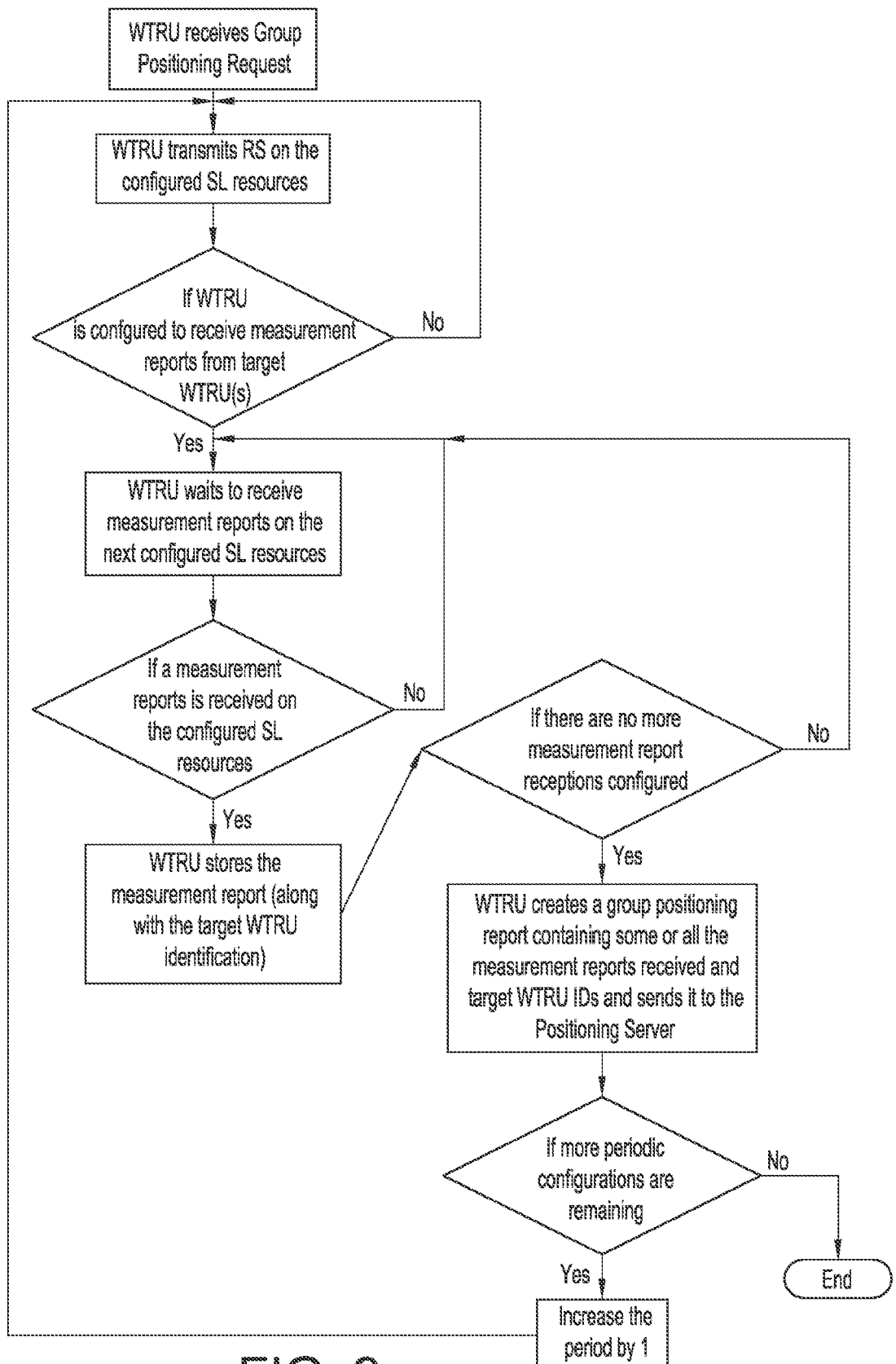
FIG. 9 illustrates an example associated with positioning reference signals.
Figure 10:
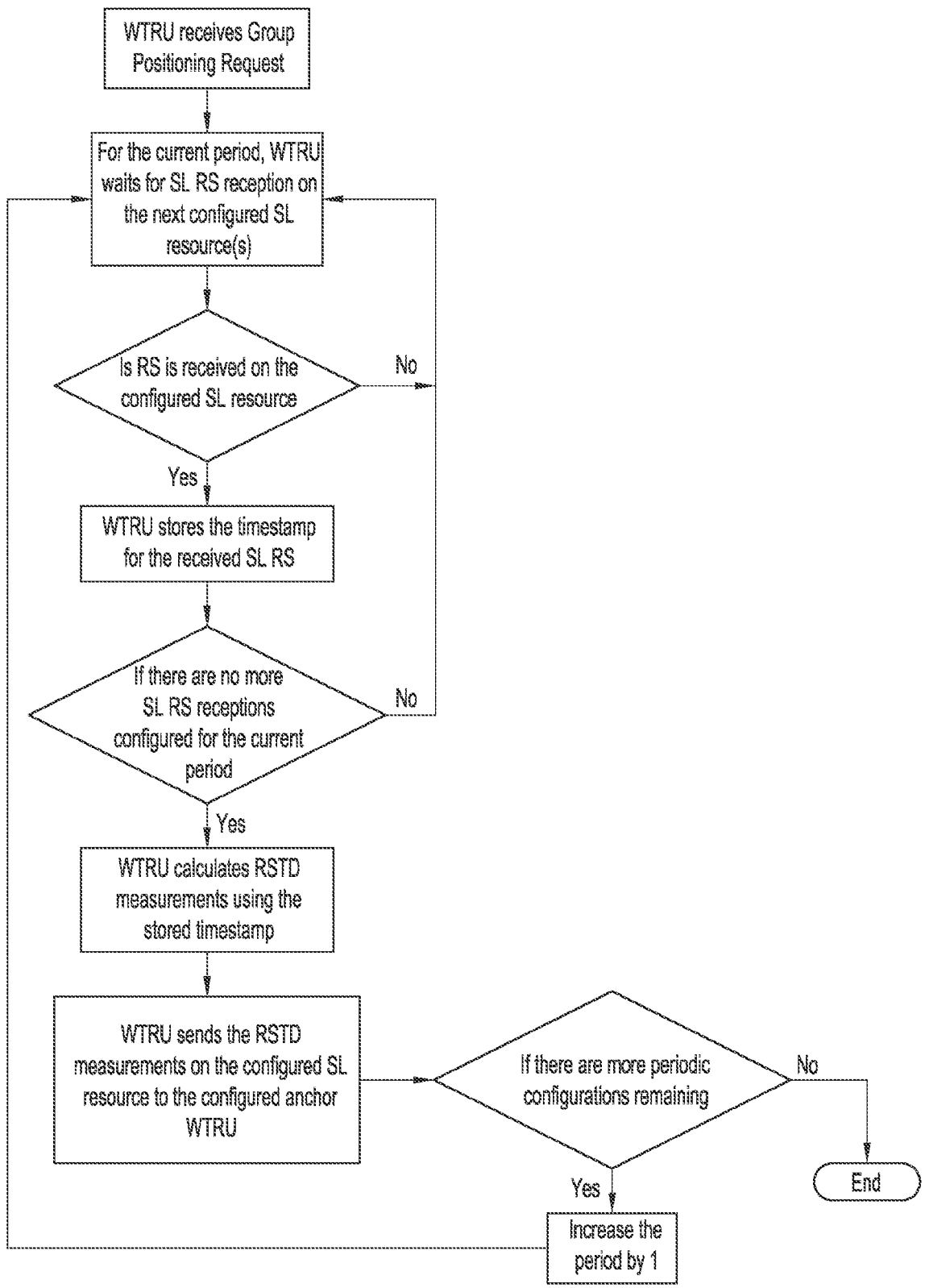
FIG. 10 illustrates an example associated with positioning measurements and reporting.

FIGS. 8, 9, and 10 illustrate examples associated with group positioning (e.g., associated with one or more of: reference signal transmission by an anchor WTRU, positioning measurements and reporting by target WTRU(s), and/or monitoring/reporting by the anchor WTRU).

Positioning measurement and reporting techniques may be provided. One or more of the following may apply.

Positioning measurement and reporting may be initiated by a positioning server, for example, in order to determine the positions of the target WTRUs using the positioning measurements on the reference signals transmitted by anchor WTRUs. Positioning measurement and reporting may be repeated, e.g., to account for changes in the network, for example, movement of the WTRUs. Positioning measurement and reporting may be repeated at a higher rate (e.g., lower value of repetition periodicity) than the rate at which group formation is performed.

A WTRU may be configured as an anchor WTRU. One or more of the following may apply.

An anchor WTRU may transmit reference signals (e.g., sidelink synchronization signals, such as, PSSS, SSSS, or DMRS in PSBCH, or sidelink CSI-RS, or sidelink PRSs, etc.) using sidelink resources, for example associated with performing positioning measurement and reporting. The anchor WTRU may be configured with group positioning parameters. The group positioning configuration may include one or more of the following: a sidelink configuration (e.g., time and/or frequency resources) to transmit the reference signals (e.g., sidelink synchronization signals, such as, PSSS, SSSS, or DMRS in PSBCH, or sidelink CSI-RS, or sidelink PRSs, etc.); an indication of a slot, symbol, and/or sub-frame offset; an indication of the periodicity over which the transmission may be repeated; an indication of the number of transmissions; transmit power; a list of target WTRU ID(s) (e.g., ProSe WTRU IDs); spatial information (e.g., number of beams, beam IDs, etc.); an indication of a (e.g., unique) masking or scrambling sequence; a sidelink configuration (e.g., time and/or frequency resources) to receive the measurements from the target WTRU(s); a triggered reporting configuration, which may be used to send a group positioning report (e.g., definition of the event, value of threshold used to detect the event triggering, where the threshold may be used to determine if a subsequent measurement has changed as compared to the previous measurement); a triggered notification configuration (e.g., definition of the event, value of threshold, e.g., RSRP threshold, which may be used to determine whether a BS is heard by the anchor WTRU), which may be used to send a notification to the network if, for example, an anchor WTRU is unable to be configured as (e.g., or unable to continue to be configures as) an anchor WTRU; or parameters to assist the WTRU to determine whether to change the rate and/or frequency of the positioning measurements and reporting, e.g., K1, K2, K3, K4, K5 and K6, as described herein.

A configuration to transmit reference signals and/or to collect measurements reports (e.g., sent by one or more target WTRU) for an anchor WTRU may be received from a positioning server (e.g., via a group positioning request to an anchor WTRU, for example as shown in FIG. 8 and/or FIG. 9).The configuration may be received (e.g., by the anchor WTRU) using a control plane positioning protocol or a data plane positioning protocol (e.g., LTE positioning protocol (LPP), secure user plane location (SUPL), NR positioning protocol (NRPP)). A message that includes the configuration (e.g., as described herein), which may be used to enable sidelink based group positioning, may be defined for the positioning protocols between the positioning server and a respective WTRU (e.g., LPP, SUPL, NRPP). The positioning server may communicate with a BS (e.g., serving BS, for example associated with the anchor and target UEs), for example using the positioning protocol between the positioning server and a BS, e.g., LPPa, NRPPa, to grant resources for reference signal transmissions from one or more anchor WTRUs. The positioning server may communicate with the serving BS to grant the resources to perform measurement reporting to one or more anchor WTRUs (e.g., identify the resource(s) on which target WTRU(s) send measurement report(s) and on which an anchor WTRU monitors for and/or receives the measurement report), e.g., as shown in FIG. 8 and/or FIG. 9. The positioning server may send a list of anchor WTRUs and target WTRUs (e.g., in a group positioning info request, for example as shown in FIG. 8) to the BS. A message that includes the list of anchor WTRUs and target WTRUs may be defined for the positioning protocols between the positioning server and a BS (e.g., LPPa, NRPPa). The BS may allocate the sidelink resources for the reference signal transmissions and for measurement report reception for the one or more anchor WTRUs. The BS may send the allocated resource information back to the positioning server (e.g., using the positioning protocol, e.g., LPPa, NRPPa). A message that includes the granted resource and/or the list of anchor WTRUs and target WTRUs may be defined for the positioning protocols between the positioning server and a BS (e.g., LPPa, NRPPa). The positioning server may communicate with a proximity services (ProSe) function, for example, to determine the ProSe IDs for one or more anchor and target WTRUs.

The configuration to transmit reference signals and/or to monitor for and/or receive measurements reports (e.g., measurements reports sent by one or more target WTRUs) for an anchor WTRU may be transmitted by a network entity such as a BS (e.g., serving BS). The configuration may be transmitted in a downlink control channel and/or DCI, which may be masked or scrambled (e.g., CRC scrambled), for example, with a SL-RNTI or SL-PG-RNTI. An identity (e.g., a sidelink positioning RNTI (e.g., SL-P-RNTI)) may be allocated by the serving BS, which may be local to a mobility management entity (MME) or positioning server. The SL-P-RNTI may be allocated to transmit the configuration to transmit reference signals and/or to monitor for and/or receive measurements reports. The configuration may be received from the serving BS via a downlink shared channel, where the resources for the downlink shared channel may be indicated in the DCI, which may be scrambled with the SL-P-RNTI. The configuration may be included in (e.g., signaled via) higher layer parameters (e.g., RRC) and may be activated dynamically, for example, using a medium access control element (MAC-CE) or DCI scrambled with SL-RNTI or SL-PG-RNTI or SL-P-RNTI.

The anchor WTRU may monitor for and/or receive measurement report transmission(s) from one or more target WTRUs, e.g., after the transmission of reference signals on the configured sidelink resources. The configuration of sidelink resources and the list of target WTRU IDs (e.g., ProSe WTRU ID) may be provided to the anchor WTRU, for example, in the group positioning configuration, e.g., from a positioning server or serving BS.

On a condition of receiving measurement report(s) (e.g., one or more of angular info, RSTD, Rx-Tx time difference, RSRP, etc.) on the configured sidelink resources, an anchor WTRU may prepare a group positioning report that includes the measurement results received from one or more target WTRUs (e.g., the anchor WTRU may send a group report that includes measurements from multiple target WTRUs whose measurements exceed a threshold, for example as disclosed herein). The anchor WTRU may include an indication of each of the WTRU IDs (e.g., ProSe ID) of the corresponding target WTRUs in the anchor WTRU's group positioning report. The group positioning report may include measurements results from the one or more target WTRUs, e.g., in addition to the WTRU IDs.

An anchor WTRU may send a group positioning report, e.g., to a network device such as a positioning server. A configuration to send a group positioning report using a positioning protocol (e.g., LPP, SUPL, NRPP) may be provided to the anchor WTRU, e.g., by the positioning server.

An anchor WTRU may send a group positioning report to the serving BS using uplink resources (e.g., PUCCH or PUSCH resources). A configuration of the uplink resources (e.g., over PUCCH or PUSCH) may be provided by the serving BS, for example, as a part of a group positioning configuration. If an anchor WTRU is not configured with the uplink resources to send a group positioning report, the anchor WTRU may send a scheduling request to the serving BS, for example, to get a grant for the uplink resources (e.g., over PUSCH) for sending group positioning report to the serving BS.

An anchor WTRU may be configured to perform triggered reporting of group positioning reports. The anchor WTRU may be triggered to report received measurement report(s) and/or associated measurement(s) to the network (e.g., a positioning server or serving BS), e.g., if the anchor WTRU receives the measurement report(s) from the configured target WTRU(s) (e.g., some or all the target WTRU from which the anchor WTRU is configured to expect measurement reports),. For example, the anchor WTRU may be triggered to send received measurement report(s) and/or associated measurement(s) if the anchor WTRU determines that the positioning measurements from one or more target WTRUs have changed (e.g., changed significantly) from a previously measured value (e.g., the change in the measured values is greater than a threshold, such as changed by more than K dB from a previously measured value). The anchor WTRU may include (e.g., may only include) the reports of the target WTRU(s) for which the measurement value changed by more than the threshold. The configuration of triggered reporting may include one or more of the value of threshold, the definition of the event, etc. The configuration may be sent by the network (e.g., a positioning server or serving BS) to the anchor WTRU, for example, via an RRC configuration or in the group positioning configuration. The triggered report may be sent using a positioning protocol (e.g., LPP, SUPL, NRPP), e.g., to a positioning server. The triggered report may be sent as an RRC uplink message to the network. The triggered report may be sent using an uplink shared channel (e.g., over PUSCH) to the serving BS. The anchor WTRU may send a scheduling request to the serving BS to grant the uplink resources (e.g., for PUSCH).

If (e.g., for periodic/semi-persistent configuration of positioning measurements and reporting) an anchor WTRU determines to change or request a change to the rate and/or the periodicity of positioning measurements and reporting by target WTRU(s) and/or that a change in rate and/or periodicity of monitoring and/or reporting by the WTRU is needed (e.g., measurements, reporting, and/or monitoring), the anchor WTRU may indicate the determination to the network. The anchor WTRU may send an indication to increase or decrease the rate and/or periodicity of positioning measurements and reporting associated with target WTRU(s) (e.g., 2 bit indication added (e.g., prepended) to the group positioning report on the allocated resources, such as, '00' or '11' for no change, '01' for rate increase, and '10' for rate decrease). The network may reconfigure the positioning measurements and reporting based on the indication received from the anchor WTRU. The anchor WTRU may determine a rate/periodicity change for measurements, reporting, and/or monitoring. One or more of the following may apply. The anchor WTRU may monitor for and/or receive the measurement report(s) from the target WTRU, e.g., for one or multiple measurement periods. If the measurement report(s) (e.g., measurement(s)) of a target WTRU (e.g., each target WTRU) do not change more than a threshold, e.g., the changes are within the K1 dBs over the last K2 periods, the anchor WTRU may request that the network lower the rate of measurement and reporting. If the measurement report(s) (e.g., measurement(s)) of a target WTRU (e.g., each target WTRU) change more than a threshold, e.g., the change (e.g., mean change) is more than a number of dB over a number of periods, for example K3 dB over the last K4 periods, the anchor WTRU may request that the network increase the rate of measurement and reporting. If the anchor WTRU determines that location of the target WTRU or the anchor WTRU has changed (e.g., more than a threshold, K5 for example) during a number of periods (e.g., the last K6 measurement periods for example), the anchor WTRU may request that the network increase the rate of measurements, reporting, and/or monitoring. The anchor WTRU may determine its own location/position change and/or speed by other means, such as, GNSS measurements, in-device gyroscope, accelerometer, IMU, etc. The anchor WTRU may determine a target WTRU's location change by the measurement reports received from the target WTRU. The values of K1, K2, K3, K4, K5 and K6 may be configured by the network as a part of the group positioning configuration.

If an anchor WTRU determines that the anchor WTRU may not be configured as (e.g., may no longer be configured as) a valid anchor WTRU (e.g., while actively performing positioning measurements and reporting), the anchor WTRU may indicate the determination to the network. The indication of the determination to the network may be configured as an event based notification or report, where the configuration may be provided by the network. The event may be triggered in one or more of the following scenarios. The event may be triggered if, e.g., while actively performing/monitoring positioning measurements and reporting, the anchor WTRU determines that the anchor WTRU is unable to perform accurate measurements to estimate the anchor WTRU's location (e.g., the anchor WTRU does not listen to or is not capable of listening to a threshold number of base stations, more than one or two BSs for example) (e.g., determined by the ability of the anchor WTRU to monitor downlink measurements from one or more neighboring BSs). The anchor WTRU may indicate the determination that the anchor WTRU is unable to be configured (e.g., unable to continue to be configured) as an anchor WTRU to the network. A threshold (e.g., RSRP threshold) may be used to determine whether an anchor WTRU is able to listen to a BS (e.g., unable to receive communication from a BS). In examples, the anchor WTRU may compare the threshold to the received downlink measurement (e.g., RSRP) from the BS. The threshold may be received from the network, e.g., in the triggered notification configuration. The configuration of the triggered notification (e.g., which may include at least or one or more of: the value of RSRP threshold, a threshold indicating the minimum number of BSs that need to be listened to, the definition of the event, etc.) may be sent by the network (e.g., a positioning server or serving BS) to the anchor WTRU, e.g., in RRC configuration or in a group positioning configuration. The triggered notification sent by the anchor WTRU may be sent using the positioning protocol (e.g., LPP, SUPL, NRPP) to the positioning server. The triggered notification may be sent via an RRC uplink message to the network. The triggered notification may be sent using the uplink shared channel (e.g., over PUSCH), e.g., to the serving BS. The anchor WTRU may send a scheduling request to the serving BS to grant the uplink resources (e.g., over PUSCH). The network may reconfigure the positioning measurements and reporting based on the received triggered notification from an anchor WTRU.

FIG. 9 is an example illustration associated with an anchor WTRU performing reference signal transmissions and group positioning reporting. One or more of the following may apply.

As shown in FIG. 9, the anchor WTRU may receive a configuration from the network associated with group positioning (e.g., a group positioning configuration, group positioning request, etc.). As shown in FIG. 9, the anchor WTRU may transmit reference signal(s), for example on configured SL resource(s) (e.g., as configured in the received configuration). As shown in FIG. 9, the anchor WTRU may monitor for and/or receive measurement report(s) from target WTRU(s) (e.g., comprising measurement(s) associated with the transmitted reference signal(s). As shown in FIG. 9, the anchor WTRU may store measurement report(s) received from target WTRU(s) (e.g., along with target WTRU ID(s)). As shown in FIG. 9, the anchor WTRU may create and/or send a group positioning report based on the received measurement report(s) (e.g., the WTRU may send each of the received measurements; the WTRU may send the received measurement(s) if condition(s) are satisfied, etc.). As shown in FIG. 9, the anchor WTRU may terminate reference signal transmission, measurement result collection, and the group positioning reporting, e.g., if the number of transmissions given in the group positioning configurations are completed.

The anchor WTRU may be reconfigured to terminate or alter its configuration (e.g., reference signal transmission, and/or measurement result collection or/and the group positioning reporting) by the positioning server using the positioning protocol (e.g., LPP, NRPP, SUPL) or by the serving BS (e.g., by RRC or DCI).

A WTRU may be configured as a target WTRU. One or more of the following may apply.

A target WTRU may monitor for reference signals on the sidelink, e.g., SL channel (e.g., reference signals may be sidelink synchronization signals, such as, PSSS, SSSS, or DMRS in PSBCH, or sidelink CSI-RS, or sidelink PRSs, etc.) from one or more anchor WTRUs (e.g., for the purpose of group positioning using sidelink). The target WTRU may perform measurements on the received reference signals on the sidelink (e.g., SL channel), for example, to estimate one or more configured parameters related to WTRU positioning (e.g., RSRP, Time of arrival (TOA), Angle of Arrival (AOA), RS time difference (RSTD), etc.). The target WTRU may be configured with a measurement configuration, e.g., received from a network entity or anchor WTRU. The measurement configuration may include one or more of the following: a sidelink configuration (e.g., time and/or frequency resources), which may be used to receive reference signals from one or more anchor WTRUs; an indication of the reference anchor WTRU (e.g., ProSe WTRU ID of a reference anchor WTRU or an index of the reference signal of the reference anchor WTRU), which may be used by the target WTRU to determine a relative time difference (e.g., RSTD) between two reference signals (e.g., between the reference signal received from the reference anchor WTRU and the measured reference signal from another anchor WTRU); an indication of the periodicity, e.g., the period over which the measurements and reporting may be repeated; an indication of the number of transmissions (e.g., number of transmission of the reference signal transmissions on the sidelink); an indication of the slot, symbol, and/or sub-frame offset, for example for the reference signal transmission on the sidelink; an indication of the destination anchor WTRU ID (e.g., sidelink L2 ids, such as, ProSe WTRU IDs) to which the measurement report is to be sent; an indication of the measurement type (SL SS RSRP, TOA, AOA, RSTD, etc.); an indication of the reporting format (e.g., individual, average of N values, etc.); spatial information (e.g., number of beams, beam IDs, etc.); a (e.g., unique) masking or scrambling sequence for the anchor WTRUs (e.g., each anchor WTRU); or a sidelink configuration (e.g., time and/or frequency resources) to send measurement reports to the destination anchor WTRU.

The configuration to perform measurements by a target WTRU may be transmitted by a positioning server (e.g., a group positioning request to a target WTRU, for example as shown in FIG. 8). The configuration may be transmitted to the target WTRU using a control plane positioning protocol or a data plane positioning protocol (e.g., SUPL, LPP, NRPP). A message that includes the configuration to perform sidelink based group positioning (e.g., as described herein) may be defined for positioning protocols between the positioning server and a WTRU (e.g., SUPL, LPP, NRPP). The communication between the positioning server and the serving BS to enable the configuration of the target WTRU may be provided.

The configuration to perform measurements by a target WTRU may be transmitted by the serving BS in a downlink control channel and/or DCI, e.g., masked or scrambled (e.g., with a CRC scrambled) with SL-RNTI or SL-PG-RNTI or SL-P-RNTI. The configuration may be received by the serving BS via a downlink shared channel, where, the resources for the shared channel may be indicated in DCI (e.g.,, the DCI may be scrambled with an SL-P-RNTI). The configuration of the reference signals may be included in higher layer parameters (e.g., RRC), which may include one or more resource configurations, each with an identity. The DCI, e.g., scrambled with SL-RNTI or SL-PG-RNTI or SL-P-RNTI, may include (e.g., may only include) a resource identification, which may be used to activate the measurements on the corresponding resources.

If the target WTRU performs measurements using the reference signals from one or more anchor WTRUs, the target WTRU may send a measurement report (e.g., comprising one or more of RS identifier, angular info, RSTD, Rx-Tx time difference, RSRP, etc.) to the configured destination anchor WTRU. The configuration of the sidelink resource(s) used to send a measurement report and the WTRU ID (e.g., ProSe ID) of the destination anchor WTRU may be received in the measurement configuration, which, as described herein, may be sent by a positioning server or by the serving BS. The target WTRU may, for example, send sidelink control information (e.g., SCI0) over a sidelink control channel (e.g., PSCCH) to the destination anchor WTRU. The sidelink control information may include the resource configuration for the sidelink shared channel (e.g., PSSCH), where the shared channel may be used to transmit and/or receive the measurement report(s).

A target WTRU may send the measurement report to the positioning server using a positioning protocol (e.g., LPP, SUPL, NRPP). In examples, the target WTRU may receive the measurement report configuration from the positioning server.

A target WTRU may send a measurement report to a serving BS using uplink resources (e.g., over PUCCH or PUSCH resources). In examples, the configuration of the uplink resources (e.g., over PUCCH or PUSCH resources) may be received by the serving BS (e.g., as a part of the measurement configuration).

FIG. 10 illustrates an example associated with a target WTRU performing positioning measurements and reporting using the sidelink. One or more of the following may apply.

As shown in FIG. 10, the target WTRU may receive a configuration (e.g., group positioning request) associated with sidelink reference signals to be monitored and/or associated sidelink resources (e.g., the configuration may be sent by the network or anchor WTRU). As shown in FIG. 10, the target WTRU may (e.g., for a period, such as a current period) monitor for and/or receive the sidelink reference signal(s) on the sidelink resource(s). As shown in FIG. 10, the target WTRU may store timestamp(s) for received sidelink reference signal(s). As shown in FIG. 10, the target WTRU may calculate a measurement (e.g., RSTD measurement) associated with a received sidelink reference signal (e.g., the WTRU may do so if there are no more sidelink reference signal receptions scheduled for the current period). As shown in FIG. 10, the target WTRU may send such measurement(s) to the configured anchor WTRU (e.g., using a configured sidelink resource such as a sidelink resource configured in the group positioning request). As shown in FIG. 10, the target WTRU may repeat one or more functions for remaining period(s).

A target WTRU may terminate the measurement reporting if the number of transmissions given in the measurement report configurations are completed.

A target WTRU may be reconfigured, for example, to terminate or alter the target WTRU's measurement configuration using a positioning protocol from the positioning server (e.g., LPP, NRPP, SUPL) or by the serving BS (e.g., by RRC or DCI).

Autonomous WTRU group positioning techniques may be provided. One or more of the following may apply.

Figure 11:
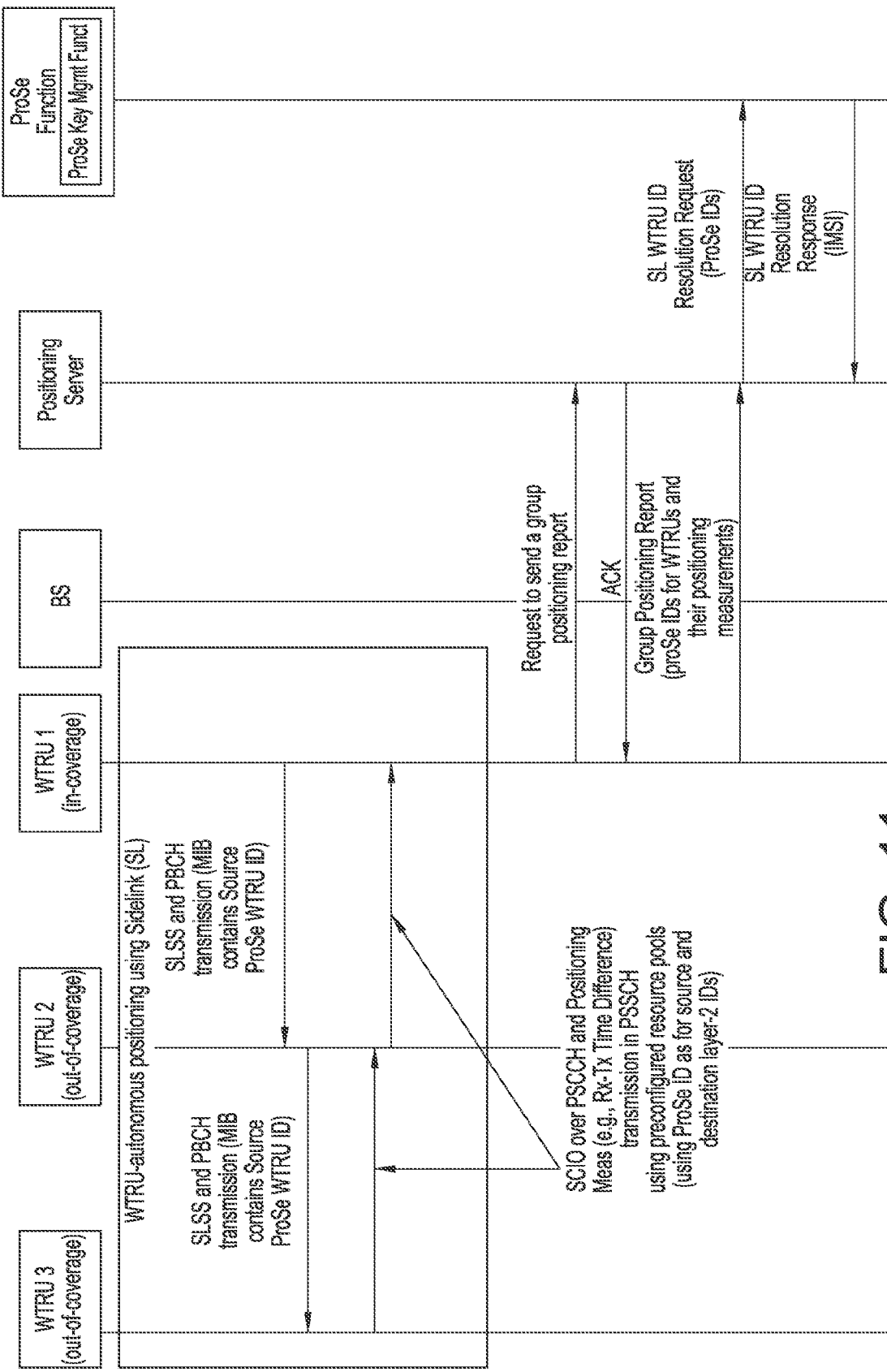
FIG. 11 illustrates an example associated with WTRU initiated WTRU group positioning.

A reference signal transmission (e.g., sidelink synchronization signal(s)) may be performed over the sidelink from in-coverage or other out-of-coverage WTRUs (e.g., to enable autonomous positioning estimation for out-of-coverage WTRUs). For example, an out-of-coverage WTRU may be a WTRU without coverage on the frequencies used for sidelink communication. The reference signal transmissions may be used to perform positioning measurements by the out-coverage WTRUs. The positioning measurements of out-coverage WTRUs may be sent to the positioning server via an in-coverage WTRU, which may be used to estimate the positions of the out-of-coverage WTRUs. An example of autonomous WTRU group positioning is illustrated in FIG. 11. Referring to FIG. 11, WTRU1 may be an in-coverage WTRU, and WTRU2 and WTRU3 may be out-of-coverage WTRUs.

One or more of the following may apply for an out-of-coverage WTRU.

An out-of-coverage WTRU may make positioning measurements (e.g., AOA, TOA, RSRP, etc.) on the reference signals (e.g., sidelink synchronization signals, such as, PSSS, SSSS, or DMRS in PSBCH, or sidelink CSI-RS, or sidelink PRSs, etc.) received from in-coverage WTRU(s) or other out-of-coverage WTRU(s) (e.g., to enable positioning estimations for out-of-coverage WTRUs using sidelink).

An out-of-coverage WTRU may send a report with its measurements results (e.g., AOA, Rx-Tx time difference, RSRP, etc.) to the reference in-coverage or out-of-coverage WTRU (e.g., the WTRU whose reference signals are used to make positioning measurements) using pre-configured sidelink resources (e.g., a set of transmission and reception resource pools for sidelink control/data information if the WTRU is out of coverage for sidelink communication may be pre-configured in the WTRU, for example, in the USIM of the UICC card). For example, the out-of-coverage WTRU may send sidelink control information (e.g., SCI0) over a sidelink control channel (e.g., PSCCH), for example, on the pre-configured sidelink resources, to the reference WTRU. In examples, the sidelink control information may include a resource configuration for the sidelink shared channel (e.g., PSBCH), where the shared channel may include the measurement report data in the corresponding sidelink shared channel. A certain SCI may be designed to send measurement reports over sidelink, such that a destination WTRU may identify the reception of the SCI over the sidelink as an indication of the measurement report. A set of resources on the sidelink may be dedicated as a sidelink control channel or a sidelink data channel. In examples, the dedicated resources may be used to transmit the measurement reports. For the out-of-coverage WTRUs, the dedicated resources may be pre-configured. For the in-coverage WTRUs, the configuration information associated with the dedicated resources may be sent by the serving BS, e.g., using RRC.

A ProSe ID of a reference WTRU, which may be used when sending the measurement reports, may be received in the data following or multiplexed with a reference signal transmission from the reference WTRU (e.g., data following the synchronization signal transmission). An in-coverage or an out-coverage WTRU may include the respective ProSe ID of the WTRU in a PSBCH transmission, for example, if a data transmission does not follow the synchronization signal transmission.

An Out-of-coverage WTRU may monitor for measurement reports from one or more other out-of-coverage WTRUs, for example, on the pre-configured sidelink resources. For example, the out-of-coverage WTRU may monitor for a certain SCI, which may be designed for measurement report transmission over the sidelink.

An Out-of-coverage WTRU may collect the measurement results from one or more other out-of-coverage WTRUs.

An out-of-coverage WTRU may include the measurement results of other out-of-coverage WTRUs in the out-of-coverage WTRU's report to the out-of-coverage WTRU's reference WTRU. For example, if the out-of-coverage WTRU received measurements results from other WTRUs, the out-of-coverage WTRU may include the results (e.g., all the results) in the out-of-coverage WTRU's report. The out-of-coverage WTRU may derive the measurement results of other WTRUs with respect to the out-of-coverage WTRU's reference (e.g., position, time, etc.). In examples, the out-of-coverage WTRU may send the derived measurement values to the reference WTRU. For example, if the measurement result of another WTRU (e.g., an out-of-coverage WTRU) includes a Rx-Tx time difference, the out-of-coverage WTRU may derive the RTT for the WTRU, for example, as an updated measurement result. The out-of-coverage WTRU may include the updated measurement results of other WTRUs in the out-of-coverage WTRU's report to the out-of-coverage WTRU's reference WTRU. The out-of-coverage WTRU may include the WTRU IDs (e.g., ProSe ID) of the corresponding WTRUs in a respective report to the out-of-coverage WTRU's reference WTRU (e.g., in addition to the measurements results of other WTRUs).

One or more of the following may apply for an in-Coverage WTRU.

An in-coverage WTRU may monitor for measurement reports from one or more out-coverage WTRUs, for example, on the pre-configured sidelink resources. For example, the in-coverage WTRU may monitor for a specific SCI, which may be designed for measurement report transmission over the sidelink.

An in-coverage WTRU may collect the positioning measurements of one or more out-of-coverage WTRUs.

An in-coverage WTRU may prepare a group positioning report, for example, upon reception of measurement reports from one or more out-of-coverage WTRUs. In examples, the group positioning report may include the measurement results (e.g., AOA, Rx-Tx time difference, RSRP, etc.) of one or more out-of-coverage WTRUs and the corresponding WTRU IDs (e.g., ProSe IDs) of the respective out-of-coverage WTRUs. The in-coverage WTRU may derive the measurement results of one or more out-of-coverage WTRUs with respect to the in-coverage WTRU's (e.g., the in-coverage WTRU's position, time, etc.). For example, if the measurement result of an in-coverage WTRU includes the Rx-Tx time difference of a respective WTRU, the in-coverage WTRU may derive the RTT for that WTRU as an updated measurement result. The in-coverage WTRU may include the updated measurement result in the in-coverage WTRU's group positioning report.

An in-coverage WTRU may send a group positioning report to a positioning server, for example, using the positioning protocol between a WTRU and the positioning server. The in-coverage WTRU may transmit a request to send a group positioning request to the positioning server. The in-coverage WTRU may monitor for an acknowledgement from the positioning server. Messages to transmit group positioning requests and acknowledgements may be designed for the positioning protocol between a WTRU and the positioning server. If, for example, an acknowledgement is received, the in-coverage WTRU may send the group positioning report to the positioning server using the positioning protocol between a WTRU and the positioning server.

An in-coverage WTRU may send a group positioning report to the serving BS using uplink resources (e.g., PUCCH or PUSCH resources). The in-coverage WTRU may be configured with periodic or semi-persistent uplink resources (e.g., over PUCCH or PUSCH), which may be used to send the group positioning report. If an in-coverage WTRU is not configured with uplink resources, the in-coverage WTRU may send a scheduling request to a serving BS to grant the uplink resources (e.g., over PUSCH) for sending the group positioning report to the serving BS.

An in-coverage WTRU may be configured to perform triggered reporting, for example, to send group positioning reports. On a condition of receiving measurement report(s) from one or more out-of-coverage WTRU, an in-coverage WTRU may detect one or more of the following situations. The in-coverage WTRU may detect that the positioning measurements received from an out-coverage WTRU have not been communicated to a positioning server in the last N1 slots (e.g., where N1 may be configured by the network, for example, as a part of the triggered reporting configuration to the in-coverage WTRU). The in-coverage WTRU may detect that the positioning measurements received from an out-coverage WTRU has changed by value that is more than a threshold (e.g., more than N2 dB as compared to a previous measurement value), where N2 may be configured by the network (e.g., as a part of the triggered reporting configuration). If the in-coverage WTRU detects one or more of the conditions, the in-coverage-WTRU may be triggered to report to the network (e.g., a positioning server or serving BS). In examples, the in-coverage WTRU may include the reports of the out-of-coverage WTRUs for which the measurement value has changed by an amount greater than the threshold (e.g., N2 dB). The triggered reporting configuration may include the value of N1, N2, the definition of the triggering event, etc. The triggered reporting configuration may be sent by the network (e.g., a positioning server or serving BS) to the in-coverage WTRU, for example, in an RRC configuration. The triggered report may be sent using the positioning protocol (e.g., LPP, SUPL, NRPP) to the positioning server. A message may be designed to transmit the triggered report using the positioning protocol between a WTRU and the positioning server. The triggered report may be sent as an RRC uplink message to the network. The triggered report may be sent using the uplink shared channel (e.g., over PUSCH), for which the in-coverage WTRU may send a scheduling request to a serving BS to grant the uplink resources (e.g., over PUSCH).

An in-coverage WTRU may compute a position (e.g., the absolute position) of one or more out-of-coverage WTRUs (e.g., WTRUs from which the in-coverage WTRU receives measurement results). The in-coverage WTRU may send the position estimation information back to the out-of-coverage WTRU (e.g., the WTRU, from which the measurements results were received) using the sidelink. The configuration of the sidelink resources may be provided to in-coverage WTRUs from the serving BS, for example, via RRC or DCI (e.g., scrambled with in coverage WTRU's SL-RNTI).

WTRU positioning measurement may be transmitted using the sidelink. One or more of the following may apply.

A sidelink resource switch may be provided. One or more of the following may apply.

A WTRU may be configured to perform positioning measurements, for example, while the WTRU is in the idle state. The positioning measurements may be performed using one or more positioning techniques, e.g., OTDOA, A-GNSS, E-CID, etc.

A WTRU may be configured with a sidelink interface to one or more other WTRUs. The WTRU may be configured to send positioning measurement reports over the sidelink interface.

The WTRU may be configured with one or more of the following parameters, which may be used to perform positioning measurement reporting over the Sidelink interface: a sidelink reporting enabled indication; a list of sidelink enabled WTRUs (e.g., ProSe IDs); a list that includes the DRX cycle for sidelink enabled WTRUs; an indication of the maximum positioning measurement reporting delay; an indication of the reporting value threshold (e.g., thresh1); an indication of the maximum positioning measurement reporting delay reduction factor (e.g., which may be set or configured to a first amount)

In examples, a sidelink reporting parameter may be used to determine if a WTRU may transmit the positioning measurement report over the sidelink interface.

A list of sidelink enabled WTRUs may be used to identify the neighbor WTRUs that may be used for positioning measurement report transmission over a sidelink interface. The WTRU may be configured to screen other WTRUs, for example, according to the list of sidelink enabled WTRUs (e.g., during discovery). If the list of sidelink enabled WTRUs is not provided, the WTRU may screen neighbor WTRUs, for example, based on certain capabilities, which may be announced during discovery.

A list that includes the discontinuous reception (DRX) cycle for sidelink enabled WTRUs may be used to inform the WTRU of the durations where neighbor WTRUs are in a connected state. The list may include a periodicity and offset value for the WTRUs (e.g., each WTRU) in the list. The list may follow a similar (e.g., the same) order used for the list of sidelink enabled WTRUs.

A maximum positioning measurement reporting delay may be used to inform the WTRU of a maximum allowed duration (e.g., a duration that spans from the instant when a positioning measurement is performed until a position measurement report is received by the receiving entity). For example, the maximum positioning measurement reporting delay may be associated with a BS, Positioning Server, etc. The maximum positioning measurement reporting delay may include the time taken for a WTRU to transmit the positioning measurement report on a sidelink interface and a subsequent forwarding by a sidelink WTRU to the receiving entity (e.g., BS, Positioning Server, etc.).

A reporting value threshold (e.g., thresh1) may refer to a change in measurement value, which, when exceeded, may trigger a reduction in the maximum position reporting delay e.g., by a maximum positioning measurement reporting delay reduction factor (e.g., a first amount). The change in the measurement value may refer to an absolute difference between a current measurement value and a previously reported positioning measurement value.

A maximum positioning measurement reporting delay reduction factor (e.g., first amount) may refer to the amount by which the maximum positioning measurement reporting delay is reduced if the change in positioning measurement value determined by a WTRU is greater than a reporting value threshold (e.g., thresh1).

A range of reporting value thresholds and maximum positioning measurement reporting delay reduction factors may be configured. A WTRU may activate a different max positioning measurement delay reduction factor, for example, depending on the reporting value threshold.

A WTRU, e.g., in the connected state, may be configured for positioning measurement reporting over a sidelink interface. The WTRU may be configured with dedicated resources for positioning measurement reporting on the sidelink interface. The dedicated resources for positioning measurement reporting may repeat in time, e.g., periodically.

A WTRU may enter an idle state, for example, upon the expiration of an inactivity timer.

A WTRU may perform positioning measurements based on a configuration, which may be provided by the network.

Upon performing the positioning measurement, a WTRU may determine the available sidelink WTRUs that are able to satisfy (e.g., currently capable of satisfying) the maximum positioning measurement reporting delay. The WTRU may include an indication of the latency for transmitting the positioning measurement report on the sidelink interface on the configured dedicated resources and forwarding the positioning measurement report by the sidelink WTRU to the receiving entity (e.g., BS, Positioning Server, etc.), including any applicable delays, for example, due to a sidelink WTRU's DRX cycle.

If more than one sidelink WTRU satisfies the requirement that the total reporting delay is less than the maximum positioning measurement reporting delay, the WTRU may select a (e.g., one) sidelink WTRU to transmit the positioning measurement report to, e.g., randomly select, select in a round-robin fashion, smallest total reporting delay, etc.

The WTRU may transmit the positioning measurement report on the sidelink interface to the selected sidelink WTRU on the configured dedicated resources. The identity of the chosen Sidelink WTRU may be included in the accompanying control information, e.g., Sidelink Control Information—Format 0 (SCI0).

If the positioning measurement obtained (e.g., measured or received) by the WTRU differs from a previously reported positioning measurement value by a value that is larger than a reporting value Threshold (e.g., thresh1), the WTRU may reduce the maximum positioning measurement delay by a configured value (e.g., the maximum positioning measurement reporting delay reduction factor (e.g., a first amount). The WTRU may use the reduced maximum positioning reporting delay value to determine a sidelink WTRU.

The maximum positioning measurement reporting delay reduction factor may be scaled, for example, according to the difference between a present measurement positioning value and previous measurement positioning value (e.g., by an amount that is greater than the reporting value threshold (e.g., thresh1). The WTRU may be configured with a scaling factor or a range of threshold values and the corresponding reduction factors.

A WTRU may compare a current measurement value to the standard deviation over the past N measurements (e.g., instead of comparing the difference between the present and previous measurement values against a configured threshold in determining a reduction in the maximum reporting delay). The standard deviation window size (N) may be configured to the WTRU and the WTRU may reduce the maximum reporting delay, for example, if the current measurement value exceeds the standard deviation by a certain value or a factor.

If the sidelink WTRUs in the configured list of sidelink enabled WTRUs are unable to satisfy the requirement that the total reporting delay is less than the maximum positioning measurement reporting delay, the WTRU may determine to send the positioning measurement report using resources from a common resource pool (e.g., common resource pool transmission).

For common resource pool transmission, a WTRU may determine the available sidelink WTRU that are able satisfy the maximum positioning measurement reporting delay. The WTRU may include the latency of transmitting the positioning measurement report on the sidelink interface on the common resource pool and forwarding the positioning measurement report by the sidelink WTRU to the receiving entity (e.g., BS, Positioning Server, etc.), including any applicable delays, for example, due to the sidelink WTRU's DRX cycle.

If more than one sidelink WTRU satisfies the requirement that the total reporting delay is less than the maximum positioning measurement reporting delay, the WTRU may select a (e.g., one) sidelink WTRU to transmit the positioning measurement report to, for example, using a common resource pool, e.g., randomly select, select in a round-robin fashion, smallest total reporting delay, etc.

The WTRU may transmit the positioning measurement report on the sidelink interface to the selected sidelink WTRU on the common resource pool. The identity (e.g., the ProSe ID or Sidelink UE ID) of the chosen sidelink WTRU may be included in the accompanying control information, e.g., Sidelink Control Information—Format 0 (SCI0).

The WTRU may transmit the positioning measurement report as a broadcast or a multicast message and indicate whether the measurement report is broadcast or multicast in the accompanying SCI0.

A WTRU may be triggered to switch to connected mode. One or more of the following may apply.

A WTRU may be configured to perform positioning measurements while in an idle state. The positioning measurements may be performed using one or more positioning techniques, e.g., OTDOA, A-GNSS, E-CID, etc.

A WTRU may be configured with a sidelink interface to one or more other WTRUs. The WTRU may be configured to send positioning measurement reports over the Sidelink interface.

The WTRU may be configured with one or more of the following parameters for positioning measurement reporting over the sidelink interface: an indication that sidelink reporting is enabled; a list of sidelink enabled WTRUs; a list that includes the DRX cycle for sidelink enabled WTRUs; an indication of the maximum positioning measurement reporting delay; an indication of the reporting value threshold (e.g., thresh2); or an indication of the maximum positioning measurement reporting delay reduction factor (e.g., a second amount).

The reporting value threshold (e.g., thresh2) may refer to an amount of change in measurement value, which, if exceeded, triggers reduction in the maximum position reporting delay e.g., by a maximum positioning measurement reporting delay reduction factor (e.g., a second amount). The change in measurement value may refer to the absolute difference between a current positioning measurement value and a previously reported positioning measurement value.

The maximum positioning measurement reporting delay reduction factor (e.g., a second amount) may refer to the amount by which the maximum positioning measurement reporting delay is reduced if the positioning measurement value change determined by the WTRU exceeds the reporting value threshold (e.g., thresh2).

Upon performing the configured positioning measurement while in the idle state, a WTRU may determine the available sidelink WTRUs that are able to satisfy the maximum positioning measurement reporting delay. The WTRU may include the latency of transmitting the positioning measurement report on the sidelink interface on the configured dedicated resources and forwarding the positioning measurement report (e.g., which may be performed by the sidelink WTRU) to the receiving entity (e.g., BS, Positioning Server, etc.), including any applicable delays, for example, due to a sidelink WTRU's DRX cycle.

If the positioning measurement obtained (e.g., measured or received) by the WTRU differs from a previously reported positioning measurement value by a value that is larger than the reporting value threshold (e.g., thresh2), the WTRU may reduce the maximum positioning measurement delay by a configured value (e.g., the maximum positioning measurement reporting delay reduction factor (e.g., a second amount)). The WTRU may use the reduced maximum positioning reporting delay value to determine the sidelink WTRU.

The maximum positioning measurement reporting delay reduction factor may be scaled, for example, if the difference between a present positioning measurement value and a previous positioning measurement value is greater than the reporting value threshold (e.g., thresh2). The WTRU may be configured with a scaling factor or a range of threshold values and the corresponding reduction factors.

A WTRU may compare a current measurement value with a standard deviation of the past N measurements (e.g., instead of comparing the difference between the present and previous measurement values to a configured threshold to determine the reduction in the maximum reporting delay). In examples, the window size (N) may be configured to the WTRU and the WTRU may reduce the maximum reporting delay, for example, if the current value exceeds the standard deviation by a certain value or a factor.

If the sidelink WTRUs in the configured list of sidelink enabled WTRUs are unable to satisfy the condition that the total reporting delay is less than the maximum positioning measurement reporting delay, the WTRU may choose to send the positioning measurement report directly to the receiving entity (e.g., BS, Positioning Server, etc.). In examples, the WTRU may choose to send the positioning measurement report directly to the receiving entity by transitioning to a connected state (e.g., by performing connection establishment).

If the positioning measurement obtained (e.g. measured or received) by a WTRU differs from a previously reported positioning measurement value by a value that is larger than the reporting value threshold (e.g., thresh2), the WTRU may determine to send the positioning measurement report to (e.g., directly to) the receiving entity (e.g., BS, Positioning Server, etc.). In examples, the WTRU may send the positioning measurement report to the receiving entity by transitioning to a connected state, for example, by performing connection establishment.

Multi-level switching may be performed, for example, to transmit a positioning measurement report. One or more of the following may apply.

A WTRU may be configured to perform positioning measurements while the WTRU is in an idle state. The positioning measurements may be performed using one or more positioning techniques, e.g., OTDOA, A-GNSS, E-CID, etc.

A WTRU may be configured with a sidelink interface to one or more other WTRUs. The WTRU may be configured to send positioning measurement reports over the sidelink interface.

A WTRU may be configured with one or more of the following parameters, which may be used to perform positioning measurement reporting over the sidelink interface: an indication of whether sidelink reporting is enabled; a list of sidelink enabled WTRUs; a list that includes an indication of the DRX cycle for sidelink enabled WTRUs; an indication of the maximum positioning measurement reporting relay; an indication of the reporting value threshold (e.g., thresh1); an indication of the reporting value threshold (e.g., thresh2, which may be greater than thresh1); an indication of the maximum positioning measurement reporting delay reduction factor (e.g., which may be set to a first amount); or an indication of the maximum positioning measurement reporting delay reduction factor (e.g., a second amount, which may be greater than the first amount).

A WTRU may be configured for positioning measurement reporting over the sidelink interface, for example, if the WTRU is in a connected state. The WTRU may be configured with resources (e.g., dedicated resources) for positioning measurement reporting on the sidelink interface. The dedicated resources for positioning measurement reporting may repeat, e.g., periodically.

A WTRU may enter an idle state, for example, upon expiration of an inactivity timer.

The WTRU may perform positioning measurements, for example, according to a configuration, which may be provided by the network.

A WTRU may determine the available sidelink WTRU(s) that are able to satisfy the maximum positioning measurement reporting delay (e.g., after performing the positioning measurements). The WTRU may include the latency of transmitting the positioning measurement report on the sidelink interface on the configured (e.g., dedicated) resources and forwarding of positioning measurement report by the sidelink WTRU to the receiving entity (e.g., BS, Positioning Server, etc.), including, for example, the applicable DRX cycle.

If more than one sidelink WTRU satisfies the requirement that the total reporting delay is less than the maximum positioning measurement reporting delay, the WTRU may select a (e.g., one) sidelink WTRU to transmit the positioning measurement report to, e.g., randomly select, select in a round-robin fashion, smallest total reporting delay, etc.

A WTRU may transmit the positioning measurement report on the sidelink interface to the selected sidelink WTRU, for example, on the configured (e.g., dedicated) resources. The identity (e.g., ProSe ID) of the chosen sidelink WTRU may be included in the accompanying control information, e.g., Sidelink Control Information—Format 0 (SCI0).

If the positioning measurement obtained (e.g., measured or received) by a WTRU differs from a previously reported positioning measurement value by a value that is larger than the reporting value threshold (e.g., thresh1), the WTRU may reduce the maximum positioning measurement delay by a configured value (e.g., the maximum positioning measurement reporting delay reduction factor (e.g., a first amount). The WTRU may use the reduced maximum positioning reporting delay value to select a sidelink WTRU (e.g., select the sidelink WTRU to transmit positioning measurement reports to, as described herein).

If the positioning measurement obtained by a WTRU differs from a previously reported positioning measurement value by a value that is larger than the reporting value threshold (e.g., thresh2), the WTRU may reduce the maximum positioning measurement delay by a configured value (e.g., the maximum positioning measurement reporting delay reduction factor (e.g., a second amount). The WTRU may use the reduced maximum positioning reporting delay value to select a sidelink WTRU (e.g., select the sidelink WTRU to transmit positioning measurement reports to, as described herein).

The maximum positioning measurement reporting delay reduction factor may be scaled, for example, if a difference between a present measurement positioning value and a previous measurement positioning value is greater than the reporting value threshold. The WTRU may be configured with a scaling factor or a range of threshold values and the corresponding reduction factors.

A WTRU may compare a current measurement value against the standard deviation over the past N measurements (e.g., instead of comparing the difference between the present and previous measurement values against a configured threshold to determine a reduction in the maximum reporting delay). In examples, the window size (N) may be configured to the WTRU, and the WTRU may reduce the maximum reporting delay if the current value exceeds the standard deviation by a certain value or a factor.

If the maximum positioning measurement delay is reduced by a first amount or a second amount and the sidelink WTRUs in the configured list of sidelink enabled WTRUs are unable to satisfy the condition that the total reporting delay using configured resources is less than the reduced maximum positioning measurement reporting delay, the WTRU may determine to send the positioning measurement reports, for example, using resources from a common resource pool. If the sidelink WTRU in the configured list of sidelink enabled WTRUs are unable to satisfy the requirement that the total reporting delay using common resource pool is less (e.g., is also less) than the reduced maximum positioning measurement reporting delay, the WTRU may determine to send the positioning measurement report (e.g., directly) to the receiving entity (e.g., BS, Positioning Server, etc.). In examples, the WTRU may determine to send the positioning measurement report directly to the receiving entity by transitioning to a connected state, for example, by performing connection establishment.

If the maximum positioning measurement delay is reduced by a first amount and the sidelink WTRUs in the configured List of sidelink enabled WTRUs are unable to satisfy the requirement that the total reporting delay using configured resources is less than the reduced maximum positioning measurement reporting delay, the WTRU may determine to send the positioning measurement report using resources from a common resource pool. If the maximum positioning measurement delay is reduced by a second amount and the sidelink WTRUs in the configured list of sidelink enabled WTRUs are unable to satisfy the requirement that the total reporting delay using configured resources is less than the reduced maximum positioning measurement reporting delay, the WTRU may determine to send the positioning measurement report (e.g., directly) to the receiving entity (e.g., BS, Positioning Server, etc.). In examples, the WTRU may determine to send the positioning measurement report directly to the receiving entity by transitioning to a connected state, for example, by performing connection establishment.

Figure 12:
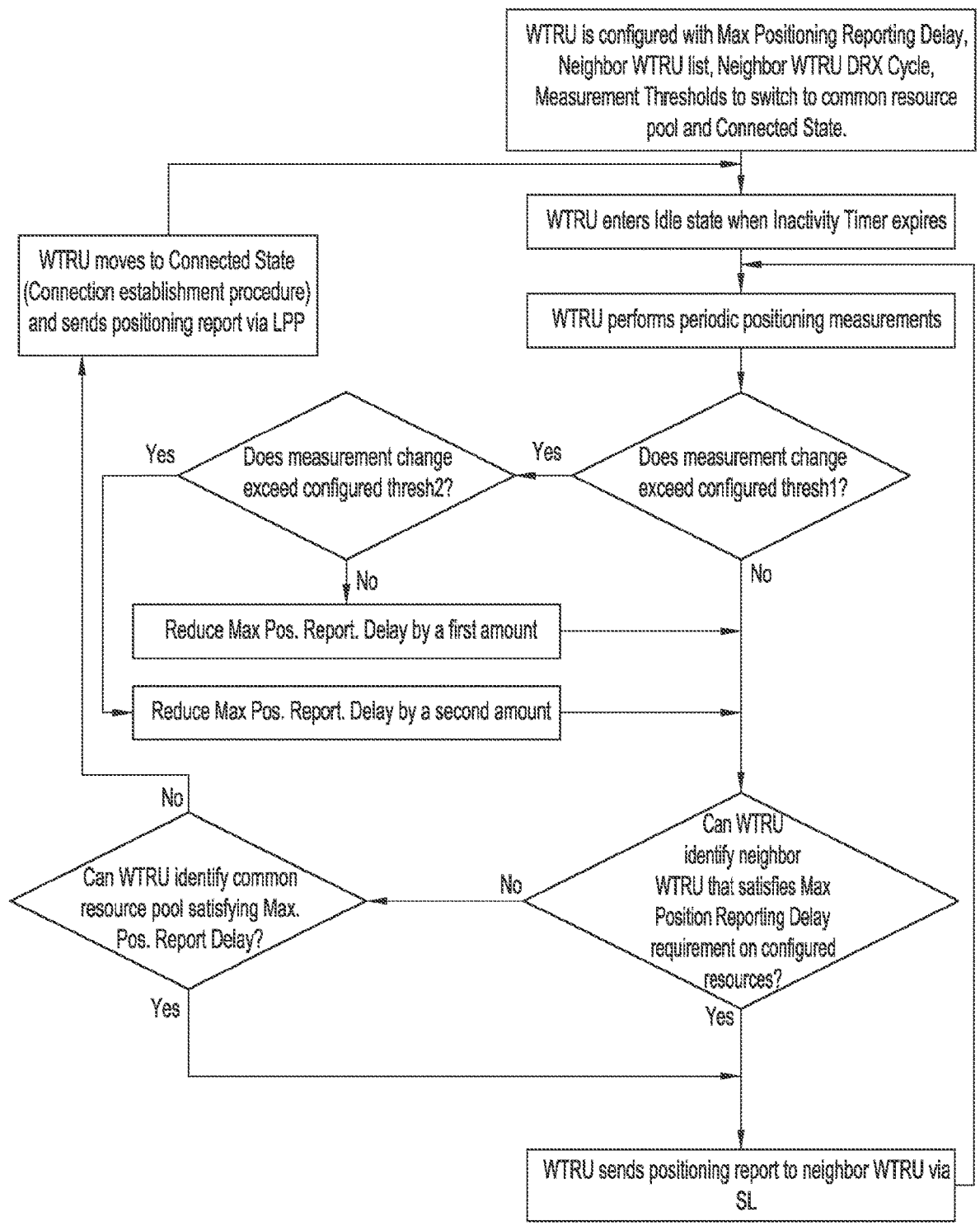
FIG. 12 illustrates an example associated with multi-level switching of resources by WTRUs.

FIG. 12 illustrates an example associated with multi-level switching of resources for measurement reporting by a WTRU performing idle state measurements. One or more of the following may apply. As illustrated in FIG. 12, the WTRU may determine to send the positioning measurement report using a common resource pool if, for example, the WTRU determines that the WTRU is unable to meet the reduced maximum positioning measurement reporting delay condition by using the configured resources (e.g., due to the observed positioning measurement difference exceeding a configured threshold). If the measurement difference exceeds a second threshold (e.g., thresh2) and the WTRU is unable to find a common resource pool that satisfies the reduced maximum positioning reporting delay value, the WTRU may send the positioning report directly to a positioning server (e.g., via an LTE Positioning Protocol (LPP)), for example, by transitioning to a connected state.

Figure 13:
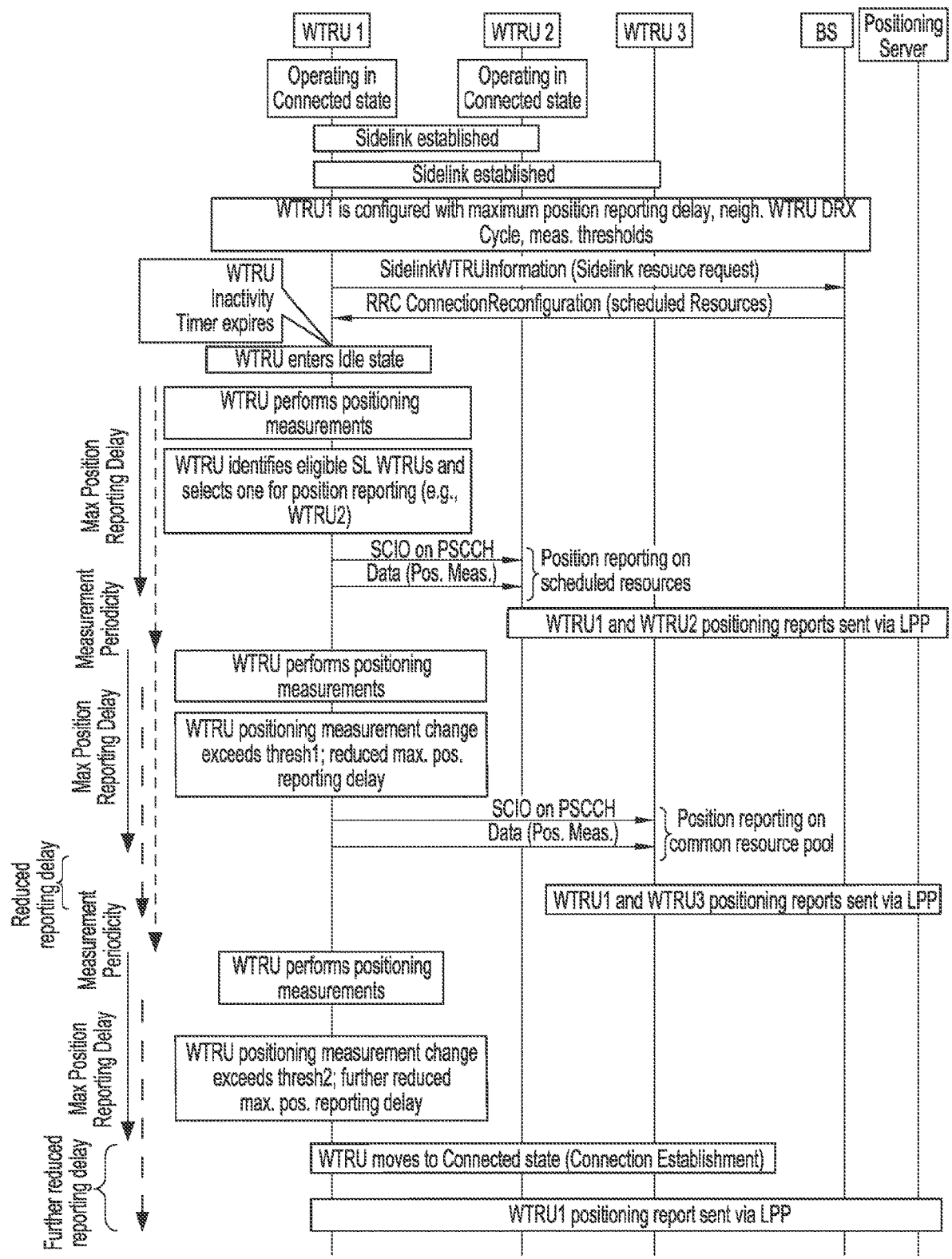
FIG. 13 illustrates an example associated with multi-level switching of positioning reporting by a WTRU.

FIG. 13 illustrates an example associated with multi-level switching of resources for measurement reporting by a WTRU performing idle state measurements. One or more of the following may apply. As illustrated in FIG. 13, the WTRU may be configured to send measurement positioning reports using configured resources. The WTRU may use the configured resources for measurement reporting, for example, as long as the positioning measurement difference does not exceed a configured threshold. The WTRU may determine to send the positioning measurement report using a common resource pool if, for example, the WTRU determines that the WTRU is unable to meet the reduced maximum positioning measurement reporting delay condition by using the configured resources (e.g., due to the observed positioning measurement difference exceeding a configured first threshold). If the measurement difference exceeds a second threshold and the WTRU is unable to find a common resource pool that satisfies the reduced maximum positioning reporting delay value, the WTRU may send the positioning report directly to a positioning server (e.g., via the LTE Positioning Protocol (LPP)), for example, by transitioning to a connected state.

Features and elements may be described in particular combinations. However, each feature or element may be performed alone or in combination with any of the other features and/or elements, or any combinations with or without other features and elements.

Although the solutions described herein consider certain technologies (e.g., New Radio (NR), 5G or LTE, LTE-A specific protocols), the techniques described herein are not restricted to any technology and may be applicable to any systems.

What is claimed is:

1. A wireless transmit/receive unit (WTRU) comprising:
   a processor configured to:
   receive configuration information associated with transmission of positioning signals to target WTRUs, wherein the configuration information indicates a first target WTRU identifier for a first target WTRU, a second target WTRU identifier for a second target WTRU, sidelink resources, and one or more thresholds;
   transmit one or more positioning signals on one or more of the sidelink resources;
   receive a first measurement report from a first target WTRU; and
   if a first measurement associated with the first measurement report from the first target WTRU exceeds a first threshold, send a first indication indicating measurement information associated with the first measurement, wherein the first measurement exceeds the first threshold if the first measurement exceeds a previous value associated with the first target WTRU by an amount.

2. The WTRU of claim 1, wherein the processor is further configured to:
   determine, based on the first measurement report, whether to send a second indication that indicates to change a rate of measurements by the first target WTRU or a rate of reporting by the first target WTRU; and
   if there is a determination to send the second indication, send the second indication, wherein:
     the second indication indicates to decrease the rate of measurements by the first target WTRU or rate of reporting by the first target WTRU if the WTRU determines that one or more measurements associated with the first measurement report have not changed more than a second threshold over a number of periods, and
     the second indication indicates to increase the rate of measurements by the first target WTRU or rate of reporting by the first target WTRU if the WTRU determines that the one or more measurements associated with the first measurement report have changed more than a third threshold over the number of periods.

3. The WTRU of claim 1, wherein the configuration information indicates a fourth threshold, and wherein if a location of the WTRU has changed more than the fourth threshold, the processor is configured to send a third indication that indicates to increase a rate associated with monitoring for measurement reports.

4. The WTRU of claim 1, wherein the processor is configured to:
   determine that a number of base stations that the WTRU is able to monitor is below a threshold number of base stations; and
   send a notification based on the determination that the number of base stations that the WTRU is able to monitor is below the threshold number of base stations, wherein the notification indicates that the WTRU is unable to listen to the number of base stations.

5. The WTRU of claim 4, wherein the WTRU is an anchor WTRU, and wherein the notification indicates that the WTRU cannot act as the anchor WTRU.

6. The WTRU of claim 1, wherein if a second measurement associated with a second measurement report from a second target WTRU exceeds a fifth threshold, the processor is configured to send a group report, wherein the group report comprises the first measurement and the second measurement.

7. The WTRU of claim 6, wherein the processor is further configured to determine that a third measurement associated with a third measurement report from a third target WTRU does not exceed a sixth threshold, and, determine to not include the third measurement in the group report.

8. The WTRU of claim 7, wherein the first threshold, the fifth threshold, and the sixth threshold are a same threshold or different thresholds.

9. The WTRU of claim 1, wherein the received configuration information further indicates at least one of a transmit power or spatial information for transmission of the positioning signals to the target WTRUs.

10. The WTRU of claim 1, wherein the measurement information comprises the first measurement.

11. A method implemented in a wireless transmit/receive unit (WTRU), the method comprising:
receiving configuration information associated with transmission of positioning signals to target WTRUs, wherein the configuration information indicates a first target WTRU identifier for a first target WTRU, a second target WTRU identifier for a second target WTRU, sidelink resources, and one or more thresholds;
transmitting one or more positioning signals on one or more of the sidelink resources;
receiving a first measurement report from a first target WTRU; and
if a first measurement associated with the first measurement report from the first target WTRU exceeds a first threshold, sending a first indication indicating measurement information associated with the first measurement, wherein the first measurement exceeds the first threshold if the first measurement exceeds a previous value associated with the first target WTRU by an amount.

12. The method of claim 11, wherein the configuration information indicates a second threshold, wherein if a location of the WTRU has changed more than the second threshold, the method further comprises sending a second indication that indicates to increase a rate of a monitoring for measurement reports.

13. The method of claim 11, further comprising:
determining that a number of base stations that the WTRU is able to monitor is below a threshold number of base stations, wherein the number of base stations comprises one or more of a gNB or an eNB; and
sending a notification based on the determination that the number of base stations that the WTRU is able to monitor is below the threshold number of base stations, wherein the notification indicates that the WTRU is unable to listen to the number of base stations.

14. The method of claim 11, wherein if a second measurement associated with a second measurement report from a second target WTRU exceeds a third threshold, the method further comprises sending a group report, wherein the group report comprises the first measurement and the second measurement.

15. The method of claim 14, further comprising:
determining that a third measurement associated with a third measurement report from a third target WTRU does not exceed a fourth threshold; and
determining to not include the third measurement in the group report.

16. The method of claim 11, wherein the measurement information comprises the first measurement.

17. A wireless transmit/receive unit (WTRU) comprising:
a processor configured to:
receive configuration information associated with transmission of a positioning signal to a target WTRU, wherein the configuration information indicates an identifier for the target WTRU, a sidelink resource, and one or more thresholds;
transmit a positioning signal on the sidelink resource;
receive a measurement report from the target WTRU;
determine whether to send a first indication that indicates to change a rate of measurements by the target WTRU or a rate of reporting by the target WTRU; and
if there is a determination to send the first indication, send the first indication, wherein:
the first indication indicates to decrease the rate of measurements by the target WTRU or the rate of reporting by the target WTRU if the WTRU determines that one or more measurements associated with the measurement report have not changed more than a first threshold over a number of periods, and
the first indication indicates to increase the rate of measurements by the target WTRU or the rate of reporting by the target WTRU if the WTRU determines that the one or more measurements associated with the measurement report have changed more than a second threshold over the number of periods.

18. The WTRU of claim 17, wherein the configuration information indicates a third threshold, and wherein if a location of the WTRU has changed more than the third threshold, the processor is configured to send a second indication that indicates to change a rate associated with monitoring for measurement reports.

* * * * *